(12) United States Patent
Sugaya

(10) Patent No.: US 12,425,134 B2
(45) Date of Patent: *Sep. 23, 2025

(54) COMMUNICATING DEVICE AND COMMUNICATING METHOD

(71) Applicant: Sony Group Corporation, Tokyo (JP)

(72) Inventor: Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,253

(22) Filed: May 17, 2024

(65) Prior Publication Data

US 2024/0305406 A1   Sep. 12, 2024

Related U.S. Application Data

(63) Continuation of application No. 17/291,609, filed as application No. PCT/JP2019/047539 on Dec. 5, 2019, now Pat. No. 12,021,627.

(30) Foreign Application Priority Data

Dec. 18, 2018   (JP) ................................ 2018-236279

(51) Int. Cl.
*H04L 1/1607* (2023.01)
*H04W 72/0453* (2023.01)

(52) U.S. Cl.
CPC ....... *H04L 1/1607* (2013.01); *H04W 72/0453* (2013.01)

(58) Field of Classification Search
CPC .......................... H04L 1/1607; H04W 72/0453
See application file for complete search history.

(56) References Cited

U.S. PATENT DOCUMENTS

| 2014/0328265 | A1* | 11/2014 | Sampath | ............... H04W 72/04 |
| | | | | 370/329 |
| 2018/0115433 | A1* | 4/2018 | Morioka | ............... H04L 5/0094 |
| 2018/0206143 | A1* | 7/2018 | Patil | ...................... H04L 45/245 |
| 2021/0307071 | A1* | 9/2021 | Sugaya | ............. H04W 74/0816 |

FOREIGN PATENT DOCUMENTS

| JP | 2005-110245 A | 4/2005 |
| JP | 2018-074595 A | 5/2018 |
| WO | 2017/006607 A1 | 1/2017 |

OTHER PUBLICATIONS

International Search Report and Written Opinion mailed on Feb. 10, 2020, received for PCT Application PCT/JP2019/047539, Filed on Dec. 5, 2019, 9 pages.

* cited by examiner

*Primary Examiner* — Basil Ma
(74) *Attorney, Agent, or Firm* — XSENSUS LLP

(57) ABSTRACT

The present technology relates to a communicating device and a communicating method that can realize communication of higher reliability.

A communicating device is provided which includes a control section configured to perform control of transmitting data to another communicating device by using a usable frequency channel, generating a request signal including channel information regarding plural usable frequency channels, the request signal being a signal for requesting an acknowledgment signal used to confirm normal reception of the data, and transmitting the generated request signal to the other communicating device by using the plural frequency channels. The present technology is applicable to wireless LAN systems, for example.

19 Claims, 21 Drawing Sheets

FIG. 6

| Frame Control | Duration | Transmit Address | Receive Address | BAR Control | BAR Information | Simulcast Channel Map | FCS |

SBAR Frame

FIG. 7

| BAR Control | | | | | |
|---|---|---|---|---|---|
| BAR Ack Policy | Multi TID | Compressed Bitmap | GCR | Simulcast | Reserved | TID INFO |

FIG. 8

| BAR Information | | |
|---|---|---|
| Block Ack Starting Sequence Control | | Starting Sequence Number |
| Fragment Number | | |

FIG. 9

| Per TID Info | Block Ack Starting Sequence Control |
|---|---|
| BAR Information | |

FIG.10

| Simulcast Channel Map | | | |
|---|---|---|---|
| 0 | 36 | 16 | 100 |
| 1 | 40 | 17 | 104 |
| 2 | 44 | 18 | 108 |
| 3 | 48 | 19 | 112 |
| 4 | 52 | 20 | 116 |
| 5 | 56 | 21 | 120 |
| 6 | 60 | 22 | 124 |
| 7 | 64 | 23 | 128 |
| 8 | 68 | 24 | 132 |
| 9 | 72 | 25 | 136 |
| 10 | 76 | 26 | 140 |
| 11 | 80 | 27 | 144 |
| 12 | 84 | 28 | 148 |
| 13 | 88 | 29 | 152 |
| 14 | 92 | 30 | 156 |
| 15 | 96 | 31 | 160 |

F I G. 12

| Frame Control | Duration | Transmit Address | Receive Address | Simulcast Channel Map | BA Control | BA Information | FCS |

SACK Frame

FIG. 13

| BA Control | | | | | |
|---|---|---|---|---|---|
| BA Ack Policy | Multi TID | Compressed Bitmap | GCR | Simulcast | Reserved | TID INFO |

FIG. 14

| BA Information | |
|---|---|
| Block Ack Starting Sequence Control | Block Ack Bitmap |

FIG. 15

| Per TID Info | Block Ack Starting Sequence Control | Block Ack Bitmap |
|---|---|---|
| BA Information | | | ns.
COMMUNICATING DEVICE AND COMMUNICATING METHOD

CROSS-REFERENCE TO RELATED APPLICATIONS

The present application is a continuation of U.S. application Ser. No. 17/291,609, filed May 6, 2021, which is based on PCT filing PCT/JP2019/047539, filed Dec. 5, 2019, which claims priority to JP 2018-236279, filed Dec. 18, 2018, the entire contents of each are incorporated herein by reference.

TECHNICAL FIELD

The present technology relates to a communicating device and a communicating method, and particularly to a communicating device and a communicating method that can realize communication of higher reliability.

BACKGROUND ART

As a data transmitting method in related art, a technology which returns an ACK (Acknowledgement) frame for reception acknowledgment on a same frequency channel immediately after an end of transmission of a data frame is used.

In addition, PTL 1 discloses a technology of performing collision detection during a SIFS (Short Inter Frame Space) interval immediately after data transmission.

CITATION LIST

Patent Literature

[PTL 1]
Japanese Patent Laid-Open No. 2005-110245

SUMMARY

Technical Problems

When an ACK frame is not correctly returned, an error occurs in other communications, or collision with the other communications occurs, for example, so that communication quality is degraded. There is thus a desire for a technological method for realizing communication of higher reliability.

The present technology has been made in view of such circumstances and is to be able to realize communication of higher reliability.

Solution to Problems

According to one aspect of the present technology, there is provided a communicating device including a control section configured to perform control of transmitting data to another communicating device by using a usable frequency channel, generating a request signal including channel information regarding plural usable frequency channels, the request signal being a signal for requesting an acknowledgment signal used to confirm normal reception of the data, and transmitting the generated request signal to the other communicating device by using the plural frequency channels.

According to one aspect of the present technology, there is provided a communicating method of a communicating device performing control of transmitting data to another communicating device by using a usable frequency channel, generating a request signal including channel information regarding plural usable frequency channels, the request signal being a signal for requesting an acknowledgment signal used to confirm normal reception of the data, and transmitting the generated request signal to the other communicating device by using the plural frequency channels.

In the communicating device and the communicating method according to one aspect of the present technology, data is transmitted to another communicating device by using a usable frequency channel, a request signal including channel information regarding plural usable frequency channels is generated, the request signal being a signal for requesting an acknowledgment signal used to confirm normal reception of the data, and the generated request signal is transmitted to the other communicating device by using the plural frequency channels.

According to one aspect of the present technology, there is provided a communicating device including a control section configured to perform control of receiving data transmitted from another communicating device, by using a usable frequency channel, generating an acknowledgment signal including channel information regarding plural usable frequency channels, the acknowledgment signal being a signal used to confirm normal reception of the data, and transmitting the generated acknowledgment signal to the other communicating device by using the plural frequency channels.

According to one aspect of the present technology, there is provided a communicating method of a communicating device performing control of receiving data transmitted from another communicating device, by using a usable frequency channel, generating an acknowledgment signal including channel information regarding plural usable frequency channels, the acknowledgment signal being a signal used to confirm normal reception of the data, and transmitting the generated acknowledgment signal to the other communicating device by using the plural frequency channels.

In the communicating device and the communicating method according to one aspect of the present technology, data transmitted from another communicating device is received by using a usable frequency channel, an acknowledgment signal including channel information regarding plural usable frequency channels is generated, the acknowledgment signal being a signal used to confirm normal reception of the data, and the generated acknowledgment signal is transmitted to the other communicating device by using the plural frequency channels.

Incidentally, a communicating device according to one aspect of the present technology may be an independent device, or may be an internal block constituting one device.

BRIEF DESCRIPTION OF DRAWINGS

FIG. 6 is a diagram illustrating an example of a configuration of an SBAR frame to which the present technology is applied.

FIG. 7 is a diagram illustrating an example of a detailed configuration of a BAR Control field.

FIG. 8 is a diagram illustrating a first example of a detailed configuration of a BAR Information field.

FIG. 9 is a diagram illustrating a second example of the detailed configuration of the BAR Information field.

FIG. 10 is a diagram illustrating an example of parameters of channel information in a bitmap format.

FIG. 12 is a diagram illustrating an example of a configuration of a SACK frame to which the present technology is applied.

FIG. 13 is a diagram illustrating an example of a detailed configuration of a BA Control field.

FIG. 14 is a diagram illustrating a first example of a detailed configuration of a BA Information field.

FIG. 15 is a diagram illustrating a second example of the detailed configuration of the BA Information field.

DESCRIPTION OF EMBODIMENT

Figure 1:
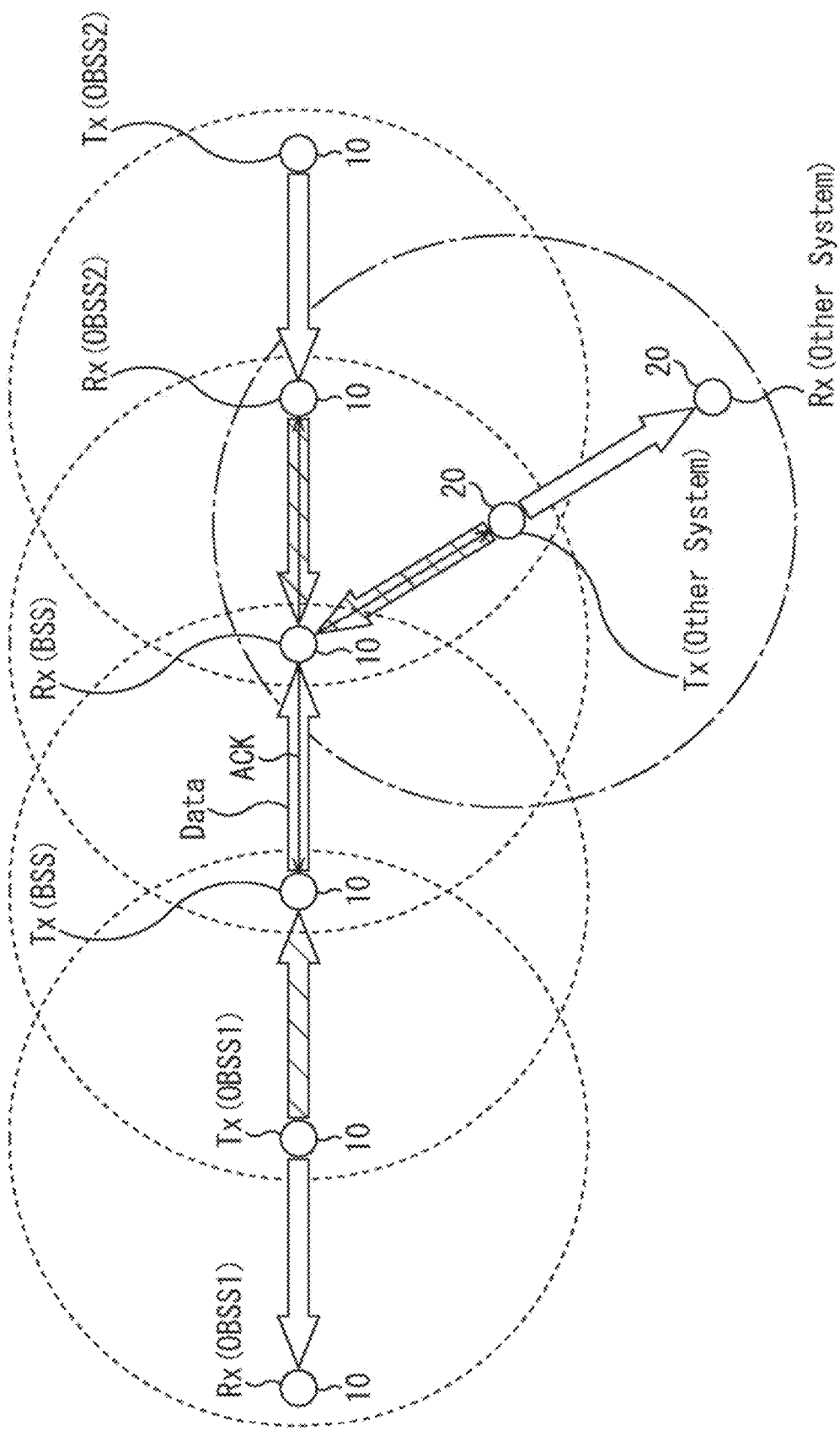
FIG. 1 is a diagram illustrating an example of a configuration of a wireless network.

An embodiment of the present technology will hereinafter be described with reference to the drawings. Incidentally, description will be made in the following order.

1. Embodiment of Present Technology
2. Modification

1. Embodiment of Present Technology

A data transmitting method in the present situation (method in the present situation) uses a technology of returning an ACK (Acknowledgement) frame for reception acknowledgment on a same frequency channel immediately after an end of the transmission of a data frame.

In addition, in the method in the present situation, at a time of setting a network allocation vector (NAV) using virtual carrier detection based on exchange of an RTS (Request to Send) frame and a CTS (Clear to Send) frame, a data frame and an ACK frame are exchanged only on a channel on which the RTS frame and the CTS frame are exchanged.

Further, a wireless LAN (Local Area Network) system uses a technology of delivering a large amount of data by one time of access control by applying a frame aggregation technology that aggregates and transmits plural data units (MPDUs: MAC Protocol Data Units). Here, a method of returning a block ACK frame to confirm reception of the data has been put to practical use.

Here, the method in the present situation generally uses a method of transmitting a data frame on one frequency channel and thereafter receiving an ACK frame on the frequency channel.

In addition, the above-described PTL 1, for example, discloses a technology of performing collision detection during a SIFS (Short Inter Frame Space) interval immediately after data transmission.

In a case where a block ACK request requests return of a block ACK frame immediately after an end of the transmission of a data frame on one frequency channel as in the method in the present situation, when the wireless transmission line is also used for reception by communication of another data frame (another communication), the return of the ACK frame may cause an error in the communication of the other data frame.

A communicating device receiving the data frame cannot correctly decode data in a case where an error is thus caused in the data. It is therefore easily assumed that collision with the other communications occurs when the ACK frame is returned on the frequency channel where the error is caused.

In addition, in a case where the frame aggregation technology is applied, there is a problem in that when the subsequent block ACK frame is not correctly returned, all of data is retransmitted, and thus the wireless transmission line is occupied over a long period.

A configuration disclosed in the above-described PTL 1, for example, has a problem that, although collision can be detected only during the SIFS interval immediately after the data transmission, collision cannot be detected in the other timings.

Further, the configuration disclosed in the above-described PTL 1 has a problem that usage conditions of frequency channels other than the frequency channel used for the data transmission cannot be grasped. That is, in a case where a reception acknowledgment is returned after the data transmission, it is not possible to return the reception acknowledgment on another frequency channel after merely grasping the conditions of one frequency channel.

The present technology proposes a communicating method (new method) for realizing communication of higher reliability by solving the above-described problems.

Specifically, in the communicating method (new method) to which the present technology is applied, a communicating device (for example, a base station) as a data frame transmitting side performs control of transmitting data (for example, an A-MPDU frame) to another communicating device (for example, a terminal station) by using a usable frequency channel, generating a request signal (for example, a SBAR frame) including first channel information (for example, a Simulcast Channel Map) regarding plural usable frequency channels, the request signal being a signal for requesting an acknowledgment signal (for example, a SACK frame) used to confirm normal reception of the data, and transmitting the generated request signal to the other communicating device (for example, the terminal station) by using the plural frequency channels.

Meanwhile, a communicating device (for example, a terminal station) as a data frame receiving side performs control of receiving data (for example, an A-MPDU frame) transmitted from another communicating device (for example, a base station) by using a usable frequency channel, generating an acknowledgment signal (for example, a SACK frame) including first channel information (for example, a Simulcast Channel Map) regarding plural usable frequency channels, the acknowledgment signal being a signal used to confirm normal reception of the data, and transmitting the generated acknowledgment signal to the other communicating device by using the plural frequency channels.

Incidentally, as will be described later in detail, an SBAR (Simulcast Block ACK Request) frame corresponds to a frame in a case where a block ACK request frame is transmitted by simulcast by using plural frequency channels (simulcast channels). In addition, a SACK (Simulcast Block ACK) frame corresponds to a frame in a case where a block ACK frame is transmitted by simulcast using plural frequency channels (simulcast channels).

Thus, the communicating device on the transmitting side transmits request control information such as a block ACK request frame by using all of usable frequency channels, and waits for a block ACK frame as a response on all of the frequency channels. In addition, the communicating device on the receiving side receives the block ACK request frame on all of usable frequency channels after an end of the reception of a data frame, and returns the block ACK frame on the usable frequency channels.

That is, the block ACK request frame is transmitted by using the usable unoccupied frequency channels. The block ACK request frame is thereby transmitted by using not only a frequency channel used to transmit the data frame but also other frequency channels. As a result, the communicating device on the receiving side reliably receives the block ACK request frame.

Further, the communicating device on the receiving side returns the block ACK frame by using the frequency channel on which the block ACK request frame can be received and also using other frequency channels not used for reception by another communicating device. Thus, the communicating device on the transmitting side reliably receives the block ACK frame.

At this time, the communicating device on the transmitting side waits for the block ACK frame transmitted from the communicating device on the receiving side on all of the frequency channels on which the block ACK request frame is transmitted. Thus, the communicating device on the transmitting side reliably receives the block ACK frame.

Then, a data frame including retransmission data that needs to be retransmitted is transmitted (retransmitted) by using frequency channels on which the block ACK frame can be received from among the frequency channels usable in the communicating device on the transmitting side and the communicating device on the receiving side. It is thereby possible to retransmit the data more reliably.

In the following, details of the communicating method (new method) to which the present technology is applied will be described with reference to the drawings.

(Example of Configuration of Wireless Network)

FIG. 1 is a diagram illustrating an example of a configuration of a wireless network.

In FIG. 1, a white circle (○) in the figure indicates the presence position of each communicating device 10, and a broken line circle on the outside with the presence position as a center corresponds to a reachable range of a radio wave from each communicating device 10. In addition, thick arrows in the figure represent a flow of a data frame between communicating devices 10, and thin arrows in the figure represent an ACK frame. Incidentally, while there are also communicating devices 20 in addition to the communicating devices 10 in FIG. 1, the same is true for the communicating devices 20.

Here, on a wireless LAN network of a basic service set (BSS), communication is being performed between a communicating device 10Tx (BSS) on a transmitting side and a communicating device 10Rx (BSS) on a receiving side.

In this situation, there are a communicating device 10Tx (OBSS1) on a transmitting side and a communicating device 10Rx (OBS2S) on a receiving side on a wireless LAN network of each of overlapping basic service sets (OBSS1 and OBSS2) in the surroundings, and there is further a communicating device 20Tx (Other System) on a transmitting side of another system different from a wireless LAN system.

Incidentally, the other system includes, for example, wireless communication systems of LTE (Long Term Evolution)/LTE-Advanced developed by 3GPP (Third Generation Partnership Project), 5G (5th Generation), and the like.

In this case, in a case where a data frame is transmitted from the communicating device 10Tx (BSS) to the communicating device 10Rx (BSS) (arrow of "Data" in the figure), a signal from the communicating device 10Tx (OBSS1) present in the surroundings of the communicating device 10Tx (BSS) becomes an interference wave (hatched arrow in the figure).

In addition, after the communicating device 10Rx (BSS) receives the data frame from the communicating device 10Tx (BSS), the communicating device 10Rx (BSS) returns an ACK frame for acknowledgment of the reception of the data frame (arrow of "ACK" in the figure). However, signals from the communicating device 10Rx (OBSS2) and the communicating device 20Tx (Other System) present in the surroundings of the communicating device 10Rx (BSS) become interference waves (hatched arrows in the figure).

In addition, conversely, the ACK frame transmitted from the communicating device 10Rx (BSS) can be an interference source from viewpoints of the communicating device 10Rx (OBSS2) and the communicating device 20Tx (Other System) in the surroundings of the communicating device 10Rx (BSS) (thin arrows within the hatched arrows in the figure).

(Flow of Data Retransmission in Present Situation)

In the following, a flow of data retransmission by the method in the present situation will be described with reference to FIG. 2 and FIG. 3.

Figure 2:
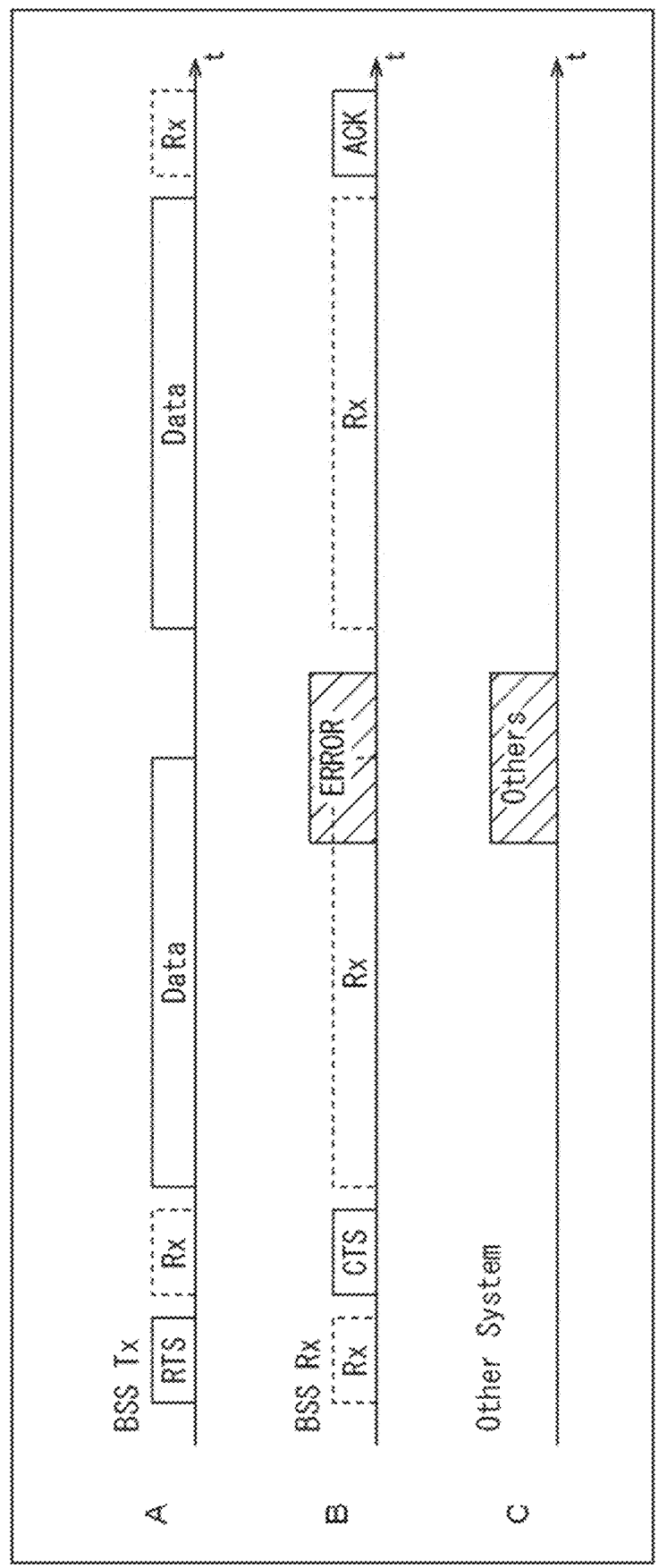
FIG. 2 is a diagram illustrating a flow of data retransmission by a method in the present situation.

FIG. 2 represents a case where the communicating device 10Rx (BSS) cannot return (transmit) an ACK frame due to an interference wave from the other system (communicating device 20Tx (Other System)) in a case where the communicating device 10Tx (BSS) transmits a data frame and the communicating device 10Rx (BSS) receives the data frame.

That is, basically, in the case of a wireless LAN system, virtual carrier sensing based on a network allocation vector (NAV) can be set for the usage of a wireless transmission line in advance by exchange of an RTS frame and a CTS frame. However, in the case where the other system is present, the presence of the RTS frame and the CTS frame cannot be grasped, and therefore similar provision cannot be made.

FIG. 2 indicates that in the case where the communicating device 20Tx of the other system (Other System) that cannot grasp the presence of the RTS frame and the CTS frame is present, an interference is caused by a signal from the communicating device 20Tx of the other system and detected by the communicating device 10Rx (BSS), and therefore, after an end of the data transmission, it is detected that the wireless transmission line is being used, so that the ACK frame cannot be returned.

At this time, because the ACK frame is not returned from the communicating device 10Rx (BSS) after the communicating device 10Tx (BSS) transmits the data frame, the communicating device 10Tx (BSS) retransmits all of the data frame. Therefore, even the data of a part that has been able to be normally received in the communicating device 10Rx (BSS) before being subjected to the interference from the other system is retransmitted. Thus, even the data of the part that has been able to be originally received, that is, the data of an unnecessary part is retransmitted.

Figure 3:
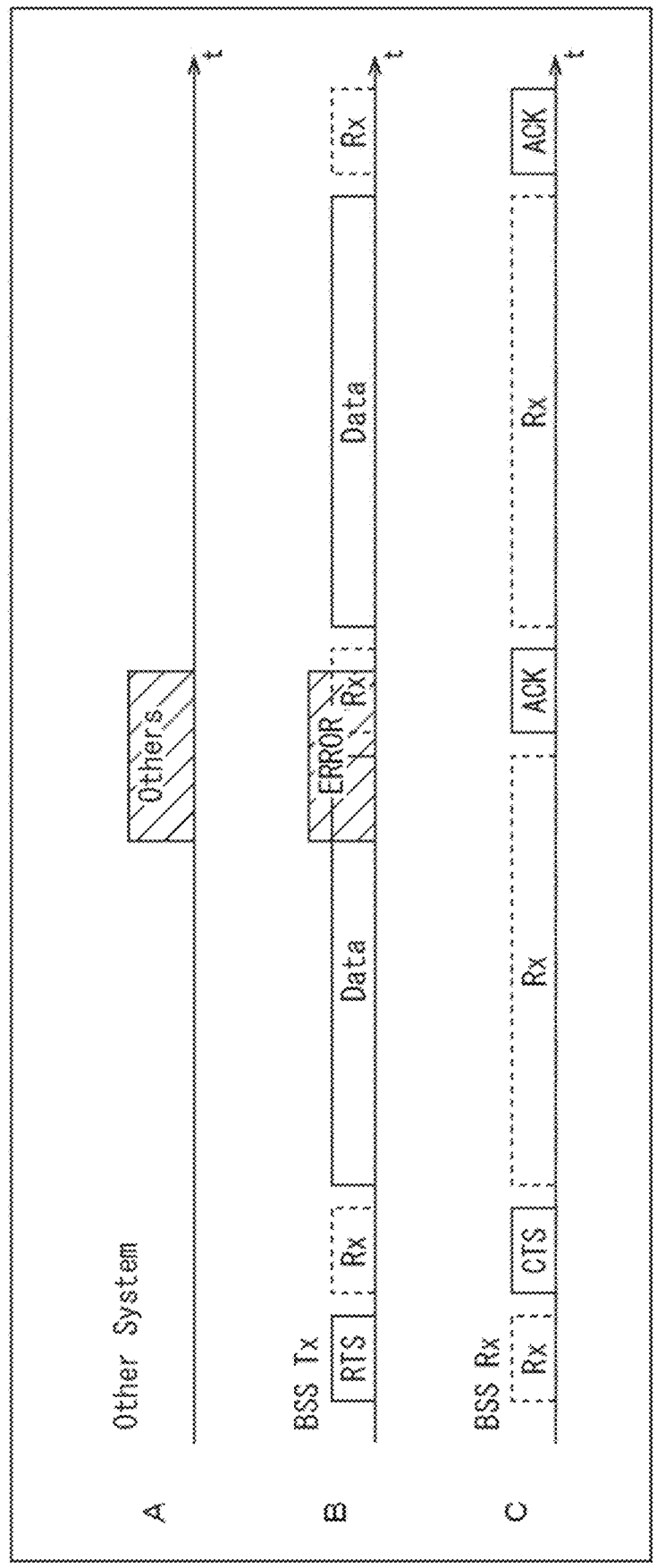
FIG. 3 is a diagram illustrating a flow of data retransmission by the method in the present situation.

In addition, FIG. 3 represents a case where the communicating device 10Tx (BSS) cannot receive an ACK frame due to an interference wave from the other system in a case where the communicating device 10Tx (BSS) transmits a data frame and the communicating device 10Rx (BSS) receives the data frame.

That is, as in the case of FIG. 2 described above, normally, virtual carrier sensing based on a network allocation vector (NAV) can be set in the case of the wireless LAN system. However, the other system cannot grasp the presence of the RTS frame and the CTS frame, so that similar provision cannot be made.

FIG. 3 indicates that a signal from the communicating device 20Tx of the other system (Other System) becomes an interference, and that the communicating device 10Tx (BSS) cannot normally receive the ACK frame transmitted by the communicating device 10Rx (BSS).

At this time, because the ACK frame is not returned from the communicating device 10Rx (BSS) after the communicating device 10Tx (BSS) transmits the data frame, the communicating device 10Tx (BSS) retransmits all of the data. That is, also in the case of FIG. 3, as in the above-described second case, even the data of a part that has been able to be normally received before the interference from the other system is received is retransmitted. Thus, the data of an unnecessary part is retransmitted.

The communicating method (new method) to which the present technology is applied can provide a mechanism that makes it possible to transmit a data frame and return an ACK frame reliably even under a crowded environment such as an environment that includes the other system together with the wireless LAN system.

(Flow of Operation of New Method)

Figure 4:
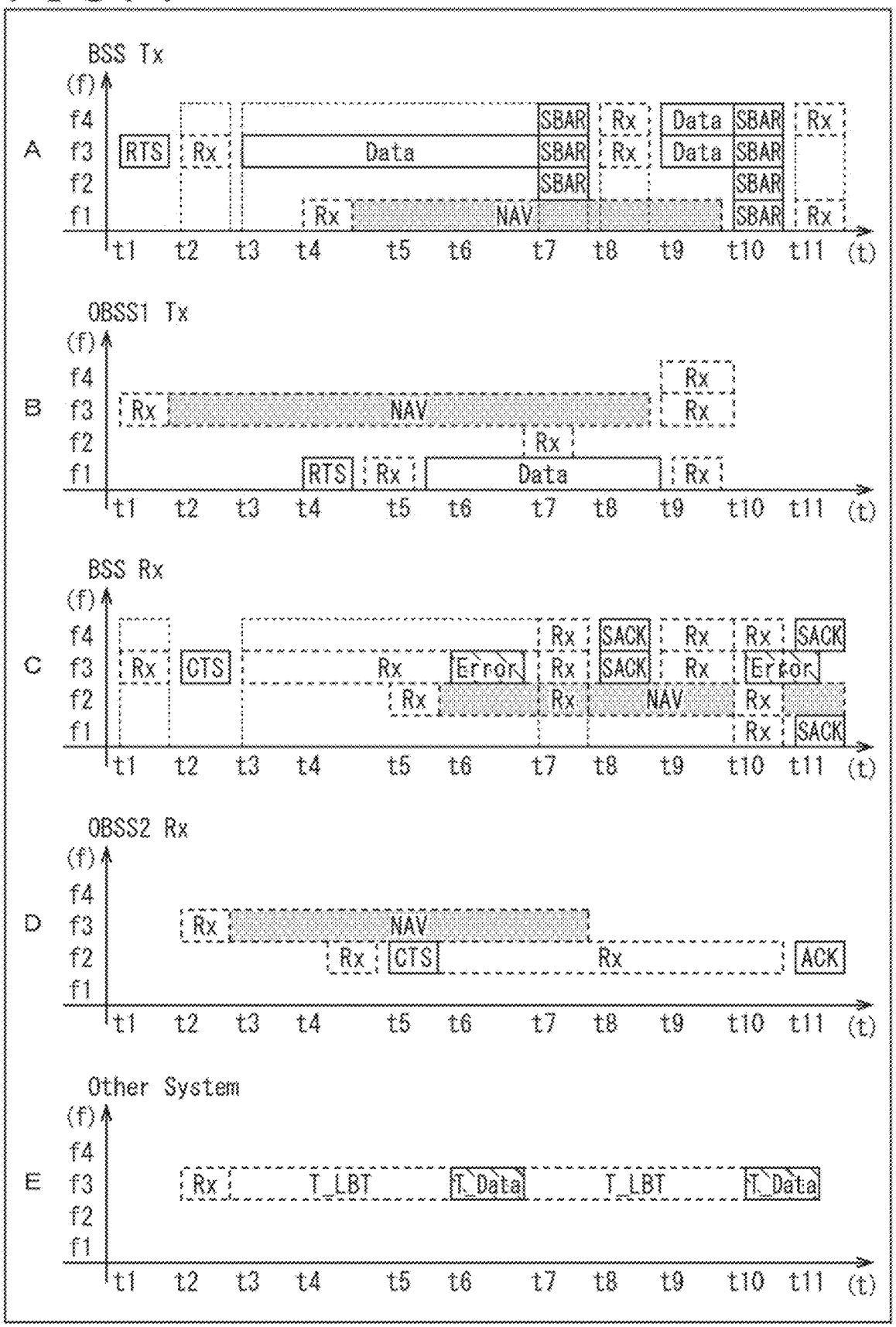
FIG. 4 is a diagram illustrating a flow of an operation of each communicating device in a case where a new method is applied.

FIG. 4 illustrates a flow of an operation of each communicating device 10 and a communicating device 20 in a case where the new method is applied.

In FIG. 4, plural frequency channels are used for data transmission. Thus, for the convenience of description, FIG. 4 indicates frequency channels (f) on an axis of ordinates and indicates time (t) on an axis of abscissas, illustrates a state in which an operation is performed using four frequency channels from f1 to f4, and illustrates actions each changing with a change in time in parallel with each other.

It is to be noted that, while FIG. 4 illustrates a case where the four frequency channels are used, there is no limitation to this, but the number of frequency channels may be three or less or five or more.

A and B in FIG. 4, that is, a first row and a second row in the figure each illustrate a flow of an operation of the communicating device 10Tx (BSS) on the transmitting side and the communicating device 10Tx (OBSS1) on the transmitting side. In addition, C and D in FIG. 4, that is, a third row and a fourth row in the figure illustrate a flow of an operation of the communicating device 10Rx (BSS) on the receiving side and the communicating device 10Rx (OBSS2) on the receiving side. Further, E in FIG. 4, that is, a fifth row in the figure illustrates a flow of an operation of the communicating device 20Tx (Other System) of the other system.

Incidentally, in FIG. 4, the respective positions of the communicating device 10Tx (BSS), the communicating device 10Tx (OBSS1), the communicating device 10Rx (BSS), the communicating device 10Rx (OBSS2), and the communicating device 20Tx (Other System) correspond to the positional relation illustrated in FIG. 1.

At time t1, the communicating device 10Tx (BSS) transmits an RTS frame by using a frequency channel f3 ("RTS" in A of FIG. 4). This RTS frame is received (detected) by the communicating device 10Rx (BSS) and the communicating device 10Tx (OBSS1) ("Rx" in B and C in FIG. 4, the "Rx" corresponding to the "RTS" in A of FIG. 4).

At this time, the communicating device 10Tx (OBSS1) sets a network allocation vector (NAV) on the frequency channel f3 over a duration described in the received RTS frame ("NAV" in B of FIG. 4). In addition, the communicating device 10Rx (BSS) is configured to return a CTS frame responding to the RTS frame in a case where the RTS frame received in the communicating device 10Rx (BSS) is an RTS frame addressed to the communicating device 10Rx (BSS) itself.

Then, at time t2, the communicating device 10Rx (BSS) transmits the CTS frame by using the frequency channel f3 ("CTS" in C of FIG. 4). This CTS frame is received (detected) by the communicating device 10Tx (BSS), the communicating device 10Rx (OBSS2), and the communicating device 20Tx (Other System) ("Rx" in A, D, and E of FIG. 4, the "Rx" corresponding to the "CTS" in C of FIG. 4).

Here, the communicating device 10Rx (OBSS2) sets a network allocation vector (NAV) on the frequency channel f3 over a duration described in the received CTS frame ("NAV" in D of FIG. 4). In addition, the communicating device 10Tx (BSS) is configured to transmit a data frame responding to the received CTS frame in a case where the received CTS frame is a CTS frame addressed to the communicating device 10Tx (BSS) itself.

In addition, the communicating device 20Tx (Other System) that cannot recognize the CTS frame detects the signal of the CTS frame on the basis of a reception level. However, the communicating device 20Tx (Other System) cannot grasp the contents of the CTS frame. Therefore, the communicating device 20Tx (Other System) does not set the network allocation vector (NAV), but sets a counter of a waiting time (LBT: Listen Before Talk) of carrier sensing for thereafter transmitting a signal on the frequency channel f3 ("T_LBT" in E of FIG. 4).

Thus, at time t3, the communicating device 10Tx (BSS) transmits a data frame (A-MPDU frame) by using the frequency channel f3 ("Data" in A of FIG. 4). This data frame is received (detected) by the communicating device 10Rx (BSS) and the communicating device 10Tx (OBSS1) ("Rx" in C of FIG. 4, the "Rx" corresponding to the "Data" in A of FIG. 4). However, in the communicating device 10Tx (OBSS1), the network allocation vector (NAV) on the frequency channel f3 is set ("NAV" in B of FIG. 4).

That is, the communicating device 10Tx (BSS) transmits the data frame by using the frequency channel f3 during a period from time t3 to time t7. In the new method, the communicating device 10Tx (BSS) is configured to monitor the state of the wireless communication path also on the frequency channels f1, f2, and f4 other than the frequency channel f3.

In conjunction with that, the communicating device 10Rx (BSS) receives this data frame by using the frequency channel f3 during a period from time t3 to time t7. In the new method, the communicating device 10Rx (BSS) is configured to monitor the state of the wireless communication path also on the frequency channels f1, f2, and f4.

Here, at time t4, the communicating device 10Tx (OBSS1) transmits an RTS frame by using the frequency channel f1 ("RTS" in B of FIG. 4). This RTS frame is received (detected) by the communicating device 10Tx (BSS) ("Rx" in A of FIG. 4, the "Rx" corresponding to the "RTS" in B of FIG. 4).

The communicating device 10Tx (BSS) is configured to set, at this time, a network allocation vector (NAV) on the frequency channel f1 over a duration described in the received RTS frame ("NAV" in A of FIG. 4).

Then, the communicating device 10Tx (OBSS1) receives a CTS frame on the frequency channel f1 ("Rx" next to the "RTS" in B of FIG. 4). Thus, the communicating device 10Tx (OBSS1) thereafter transmits a data frame by using the frequency channel f1 ("Data" in B of FIG. 4). The communicating device 10Tx (BSS) therefore happens to be able to receive the data frame. Thus, in the communicating device 10Tx (BSS), over a period until an end of the transmission of the data frame, the network allocation vector (NAV) is set on the frequency channel f1, and the frequency channel f1 is set in a BUSY state.

Next, at time t5, the communicating device 10Rx (OBSS2) transmits a CTS frame in order to receive a data frame by using the frequency channel f2 after time t5 ("CTS" in D of FIG. 4).

The communicating device 10Rx (BSS) is configured to set a network allocation vector (NAV) on the frequency channel f2 on the frequency channel f2 over a duration described in the CTS frame ("NAV" in C of FIG. 4) when the communicating device 10Rx (BSS) receives (detects) the CTS frame at this time ("Rx" in C of FIG. 4, the "Rx" corresponding to the "CTS" in D of FIG. 4).

Further, in a case where the communicating device 20Tx (Other System) transmits data by using the frequency channel f3 at time t6 ("T_Data" in E of FIG. 4), a problem as follows occurs. This data (signal) becomes an interference in the communicating device 10Rx (BSS), and the communicating device 10Rx (BSS) cannot correctly decode the data frame being received from the communicating device 10Tx (BSS) ("Error" in C of FIG. 4).

That is, the communicating device 20Tx (Other System) of the other system does not detect any signal over the predetermined duration (T_LBT) after the communicating device 10Rx (BSS) receives the CTS frame on the frequency channel f3. The communicating device 20Tx (Other System) of the other system therefore transmits data (signal) over a predetermined duration though the communicating device 10Rx (BSS) is performing reception ("T_Data" in E of FIG. 4).

Further, even after the communicating device 20Tx (Other System) transmits the data (signal), in a case where the communicating device 20Tx (Other System) does not detect any signal over a predetermined duration (T_LBT), the communicating device 20Tx (Other System) transmits data again ("T_Data" in E of FIG. 4).

Even in such a case, in the new method, the communicating device 10Tx and the communicating device 10Rx are configured to grasp usable frequency channels from moment to moment by monitoring the conditions of the other frequency channels (frequency channels f1, f2, and f4) during the data transmission.

Thereafter, in a case where the transmission of the data frame from the communicating device 10Tx (BSS) is ended at time t7, the frequency channels (f2 to f4) excluding the frequency channel f1 on which the network allocation vector (NAV) is set by the communicating device 10Tx (OBSS) are the usable frequency channels at the point in time.

In the new method, the communicating device 10Tx (BSS) transmits an SBAR frame by using the frequency channels f2, f3, and f4, and the communicating device 10Tx (BSS) thereafter makes a setting for receiving a response and waits on the frequency channels f2, f3, and f4 ("SBAR" in A of FIG. 4).

In this case, the communicating device 10Rx (BSS) receives the SBAR frame by using the frequency channels f2, f3, and f4 on which reception is possible ("Rx" in C of FIG. 4, the "Rx" corresponding to the "SBAR" in A of FIG. 4). However, on the frequency channel f2 where the network allocation vector (NAV) is set by the communicating device 10Rx (OBSS), the communicating device 10Rx (BSS) can receive the SBAR frame but cannot respond to the SBAR frame.

Then, the communicating device 10Rx (BSS) sets the conditions of reception of the corresponding data frame as SACK information and generates a SACK frame. In this case, a SACK frame which indicates that an MPDU part corresponding to an end of the data frame that cannot be decoded due to the interference from the communicating device 20Tx (Other System) of the other system is not delivered yet, is constructed.

Thus, at time t8, the SACK frame is transmitted from the communicating device 10Rx (BSS) to the communicating device 10Tx (BSS) on the frequency channels f3 and f4 ("SACK" in C of FIG. 4).

In response to this, the communicating device 10Tx (BSS) can receive the SACK frame from the communicating device 10Rx (BSS) by using the frequency channels f3 and f4 ("Rx" in A of FIG. 4, the "Rx" corresponding to the "SACK" in C of FIG. 4).

Then, the communicating device 10Tx (BSS) grasps that the frequency channels usable at the point in time are the frequency channels f3 and f4 and grasps the MPDU part not delivered yet on the basis of the SACK information obtained from the received SACK frame. In addition, at time t9, which is a time after the passage of a predetermined transmission waiting time, the communicating device 10Tx (BSS) retransmits a data frame including an MPDU not delivered yet by using the frequency channels f3 and f4 on which the SACK frame is returned ("Data" in A of FIG. 4).

Here, at time t9, the communicating device 10Rx (BSS) waits for the retransmission data frame on the frequency channels f3 and f4 on which the SACK frame has been transmitted, and receives the retransmission data frame by using the frequency channels f3 and f4 ("Rx" in C of FIG. 4, the "Rx" corresponding to the "Data" in A of FIG. 4).

Further, when the communicating device 10Tx (BSS) ends the transmission of the retransmission data frame at time t10, all of the frequency channels including the frequency channel f1 on which the network allocation vector (NAV) of the communicating device 10Tx (OBSS) is ended become usable at the point in time. The communicating device 10Tx (BSS) therefore transmits an SBAR frame by using the frequency channels f1 to f4 ("SBAR" in A of FIG. 4).

Then, the communicating device 10Tx (BSS) thereafter makes a setting for receiving a response and waits on the frequency channels f1 to f4 on which the SBAR frame is transmitted.

In this case, the communicating device 10Rx (BSS) receives the SBAR frame by using the frequency channels f1 to f4 ("Rx" in C of FIG. 4, the "Rx" corresponding to the "SBAR" in A of FIG. 4). However, the communicating device 10Rx (BSS) cannot correctly decode the data on the frequency channel f3 due to an interference from the communicating device 20Tx (Other System) of the other system ("Error" in C of FIG. 4).

Therefore, the communicating device 10Rx (BSS) receives the SBAR frame by using the frequency channels f1, f2, and f4. However, on the frequency channel f2 on which the network allocation vector (NAV) is set by the communicating device 10Rx (OBSS2), the communicating device 10Rx (BSS) can receive the SBAR frame but cannot respond to the SBAR frame.

Thus, at time t1*l*, a SACK frame is transmitted from the communicating device 10Rx (BSS) to the communicating device 10Tx (BSS) on the frequency channels f1 and f4 ("SACK" in C of FIG. 4).

In response to this, the communicating device 10Tx (BSS) receives the SACK frame from the communicating device 10Rx (BSS) by using the frequency channels f1 and f4 ("ACK" in A of FIG. 4, the "ACK" corresponding to the "SACK" in C of FIG. 4). Then, from the received SACK frame, the communicating device 10Tx (BSS) can grasp that all of MPDUs are delivered to the communicating device 10Rx (BSS).

Thus, the new method makes it possible to perform reception acknowledgment by an ACK frame and retransmission of a data frame reliably by also using the other frequency channels, as compared with a method that transmits data by using a sole frequency channel as in the method in the present situation. It is thereby possible to realize communication of higher reliability.

(Configuration of Data Frame)

Figure 5:
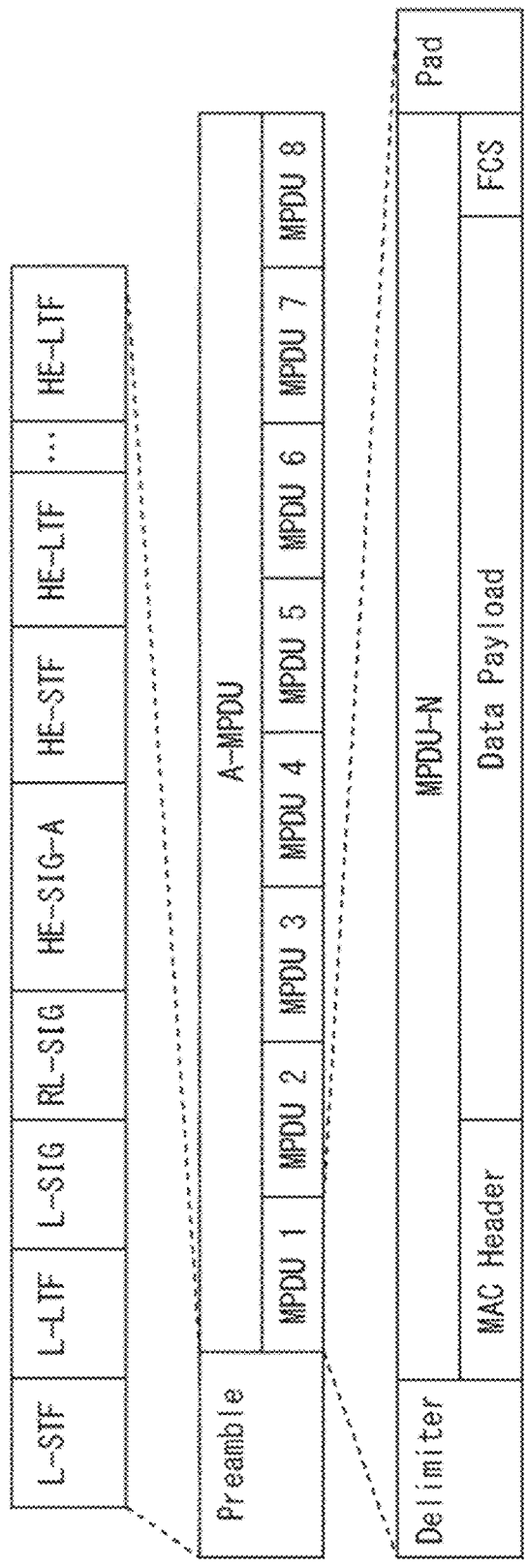
FIG. 5 is a diagram illustrating an example of a configuration of an A-MPDU to which frame aggregation is applied.

FIG. 5 illustrates an example of a configuration of an A-MPDU (Aggregation-MPDU) to which frame aggregation is applied.

In the following, description will be made of a case of using a frame configuration of an A-MPDU, that is, an A-MPDU to be transmitted as one frame obtained by aggregating plural MAC layer protocol data units (MPDU). In addition, the configuration of an A-MPDU includes MPDUs corresponding to the number of frames to be aggregated. Thus, in the following, for example, an example in which an A-MPDU as a frame includes eight sub-frames from an MPDU 1 to an MPDU 8 is illustrated.

The A-MPDU is transmitted following a preamble signal (Preamble) in a PHY layer. The preamble signal is formed by repeating an HE-LTF by a predetermined number according to the number of multiplexes of spatial multiplexing in addition to an L-STF, an L-LTF, an L-SIG, an RL-SIG, an HE-SIG-A, and an HE-STF.

Specifically, the L-STF represents a short training field in related art, and the L-LTF represents a long training field in related art. In addition, the L-SIG represents signaling information in related art, and the RL-SIG represents repeated signaling information. The HE-SIG-A represents high-density signaling information. In addition, the HE-STF represents a high-density short training field, and the HE-LTF represents a high-density long training field.

In addition, each MPDU constituting the A-MPDU includes a delimiter indicating a sub-frame boundary and an MPDU (MAC Protocol Data Unit) and is formed with a padding (Pad) added thereto as required. Further, each MPDU (assumed here to be an MPDU-N before being multiplexed) includes a predetermined MAC header, a data payload, and an FCS (Frame Check Sequence).

(Configuration of SBAR Frame)

FIG. 6 illustrates an example of a configuration of an SBAR (Simulcast Block ACK Request) frame to which the present technology is applied.

This SBAR frame is basically configured to be transmitted in a state of being added to an end of a data frame (for example, an A-MPDU) or to be transmitted independently following a predetermined preamble signal.

In FIG. 6, the SBAR frame includes Frame Control, a Duration, a Transmit Address, a Receive Address, BAR Control, BAR Information, a Simulcast Channel Map, and an FCS.

The Frame Control describes information such as a frame type indicating that this frame is an SBAR frame. The Duration describes information indicating a duration of the SBAR frame and a responding Block ACK frame.

The Transmit Address describes information identifying a communicating device as a transmission source of the SBAR frame. The Receive Address describes information identifying a communicating device as a receiving destination of the SBAR frame.

The BAR Control describes block ACK control information. The BAR Information describes information identifying a range of MPDUs for which block ACK information is requested. Incidentally, details of the fields of the BAR Control and the BAR Information will be described later with reference to FIGS. 7 to 9.

The Simulcast Channel Map describes channel information regarding plural usable frequency channels (for example, frequency channels on which a frame is transmitted at the same time). Incidentally, details of the field of the Simulcast Channel Map will be described later with reference to FIGS. 10 to 11. The FCS is a frame check sequence for error detection, the frame check sequence being added to an end.

(Details of BAR Control)

FIG. 7 illustrates an example of a detailed configuration of the BAR Control field.

The BAR Control field includes a BAR (Block ACK Request) Ack Policy indicating a kind of block ACK request and a return condition, a Multi TID indicating that plural TIDs are included, a Compressed Bitmap indicating bitmap compression, GCR indicating a group cast, Simulcast indicating the addition of the above-described channel information (FIG. 6), Reserved for future extension, and TID INFO for identifying the TIDs.

(Details of BAR Information)

FIG. 8 illustrates an example of a detailed configuration of the BAR Information field.

The BAR Information field includes a Fragment Number indicating a number in a case where fragments are formed and Block Ack Starting Sequence Control describing a start sequence number of a block ACK.

It is to be noted that the BAR Information field is not limited to the configuration illustrated in FIG. 8, and that a configuration as illustrated in FIG. 9, for example, may be used as the BAR Information field.

Specifically, FIG. 9 illustrates a case where the BAR Information field is configured as a Multi TID Block ACK Request frame. Thus, the BAR Information field includes Per TID Info for identifying each TID and Block Ack Starting Sequence Control describing a start sequence number of a block ACK and is configured by repeating this for each TID.

(Details of Simulcast Channel Map)

FIG. 10 illustrates an example of a case where the Simulcast Channel Map of FIG. 6 is represented in a bitmap format.

In FIG. 10, numbers 0 to 31 indicate respective bits of a 32-bit bitmap. In this case, usable frequency channels are assigned to the respective bits by representing a bit 0 at a start as a channel 36, representing a next bit 1 as a channel 40, . . . , and representing a bit 31 at an end as a channel 160.

Figure 11:
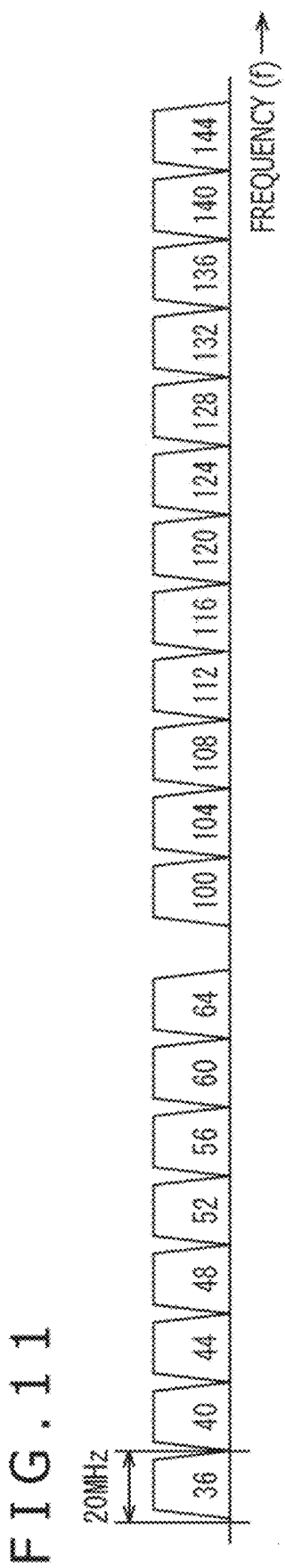
FIG. 11 is a diagram illustrating an example of an arrangement of frequency channels usable in a wireless LAN system.

Here, FIG. 11 illustrates an example of an arrangement of the frequency channels usable in the wireless LAN system. In the example of FIG. 11, channels 36, 40, 44, 48, 52, 56, 60, and 64 are arranged from a low frequency in units of 20 MHz according to a center frequency. Further, at high frequencies, up to channels 100, 104, 108, 112, 116, 120, 124, 128, 132, 136, 140, and 144 are arranged in units of 20 MHz.

That is, the numbers of the frequency channels in FIG. 10 and the numbers of the frequency channels in FIG. 11 correspond to one another, and for each of the frequency channels assigned in units of 20 MHz, whether or not the frequency channel is a usable frequency channel can be specified. For example, in the Simulcast Channel Map illustrated in FIG. 6, bits corresponding to frequency channels on which transmission is possible among the usable frequency channels represented by the bits 0 to 31 can be set to "1," and the other bits can be set to "0."

Thus, the Simulcast Channel Map describes channel information regarding the frequency channels in a bitmap format or the like.

It is to be noted that, while the channel information is represented in a bitmap format in FIG. 10, the channel information is not limited to such a format, but the channel information may adopt another format as long as the channel information is in a format that can specify channel numbers. Specifically, for example, only a start and an end of the channel numbers may be specified, or a part of the channel numbers may be omitted.

In addition, the example of the arrangement of the frequency channels illustrated in FIG. 11 is an example, and these usable frequency channels may each have a different range because usable frequency bands instituted by law in each country differ. Here, for example, frequency bandwidths narrower than frequency bandwidths of 20 MHz can be used. Specifically, for example, provision may be made for units of resource units defined in IEEE 802.11ax.

(Configuration of SACK Frame)

FIG. 12 illustrates an example of a configuration of a SACK (Simulcast Block ACK) frame to which the present technology is applied.

This SACK frame is basically configured to be transmitted independently following a predetermined preamble signal.

In FIG. 12, the SACK frame includes Frame Control, a Duration, a Transmit Address, a Receive Address, a Simulcast Channel Map, BA Control, BA Information, and an FCS.

The Frame Control describes information such as a frame type indicating that this frame is a SACK frame. The Duration describes information indicating a duration from the SACK frame to a data frame to be retransmitted as required.

The Transmit Address describes information identifying a communicating device as a transmission source of the SACK frame. The Receive Address describes information identifying a communicating device as a receiving destination of the SACK frame.

The Simulcast Channel Map describes channel information regarding plural usable frequency channels (for example, frequency channels on which a frame is transmitted at the same time). Incidentally, details of the field of the Simulcast Channel Map are similar to the contents illustrated in FIGS. 10 to 11 described above, and therefore detailed description thereof will be omitted here.

The BA Control describes block ACK control information. The BA Information describes information identifying MPDUs that have been successfully received (the information will hereinafter be referred to also as identifying information) as block ACK information. In other words, the identifying information can also be said to be information regarding retransmission data (data that needs to be retransmitted) identified when reception is confirmed for each MPDU. Incidentally, details of the fields of the BA Control and the BA Information will be described later with reference to FIGS. 13 to 15. The FCS is a frame check sequence for error detection, the frame check sequence being added to an end.

(Details of BA Control)

FIG. 13 illustrates an example of a detailed configuration of the BA Control field.

The BA Control field includes a BA (Block ACK) Ack Policy indicating a kind of block ACK and a return condition, a Multi TID indicating that plural TIDs are included, a Compressed Bitmap indicating bitmap compression, GCR indicating a group cast, Simulcast indicating the addition of the above-described channel information (FIG. 12), Reserved for future extension, and TID INFO for identifying the TIDs.

(Details of BA Information)

FIG. 14 illustrates an example of a detailed configuration of the BA Information field.

This BA Information field includes Block Ack Starting Sequence Control describing a start sequence number of a block ACK and a Block Ack Bitmap identifying a sequence number of an ACK actually received in a bitmap format from the start sequence number.

It is to be noted that the BA Information field is not limited to the configuration illustrated in FIG. 14, and that a configuration as illustrated in FIG. 15, for example, may be used as the BA Information field.

Specifically, FIG. 15 illustrates a case where the BA Information field is configured as a Multi TID Block ACK frame. Thus, the BA Information field includes Per TID Info for identifying each TID, Block Ack Starting Sequence Control describing a start sequence number of a Block ACK, and a Block Ack Bitmap identifying a sequence number of an ACK actually received in a bitmap format from the start sequence number, and is configured by repeating this for each TID.

(Example of Configuration of Communicating Device)

Figure 16:
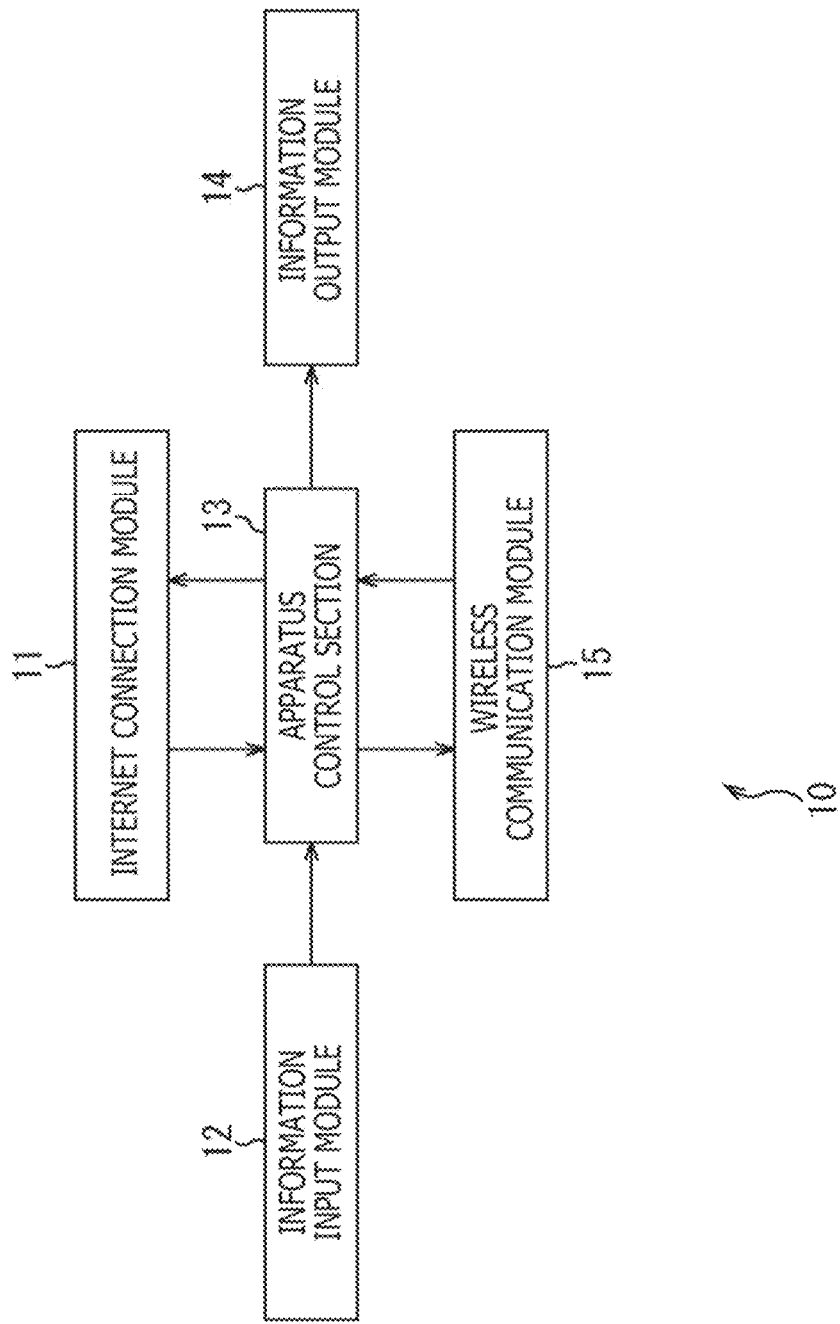
FIG. 16 is a block diagram illustrating an example of a configuration of a communicating device to which the present technology is applied.

FIG. 16 is a block diagram illustrating an example of a configuration of a communicating device (wireless communication device) to which the present technology is applied. The communicating device 10 illustrated in FIG. 16 is configured as a communicating device 10Tx on a transmitting side or a communicating device 10Rx on a receiving side on a wireless network (FIG. 1).

In FIG. 16, the communicating device 10 includes an Internet connection module 11, an information input module 12, an apparatus control section 13, an information output module 14, and a wireless communication module 15.

The Internet connection module 11 includes, for example, a circuit having a function for connecting, as a base station (access point), to an Internet network from an optical fiber network or another communication line via a service provider, a peripheral circuit thereof, a microcontroller, a semiconductor memory, and the like.

The Internet connection module 11 performs various kinds of processing related to the Internet connection under control of the apparatus control section 13. For example, the Internet connection module 11 is configured such that functions of a communication modem or the like for connecting to the Internet network are implemented in a case where the communicating device 10 operates as a base station.

The information input module 12 includes, for example, input devices such as a push button, a keyboard, and a touch panel. The information input module 12 has a function of inputting instruction information corresponding to an instruction from a user to the apparatus control section 13.

The apparatus control section 13 includes, for example, a microprocessor, a microcontroller, or the like. The apparatus control section 13 controls each part (module) to cause the communicating device 10 to operate as a base station or a terminal station.

The apparatus control section 13 performs various kinds of processing on information supplied from the Internet connection module 11, the information input module 12, or the wireless communication module 15. In addition, the apparatus control section 13 supplies information obtained as a result of the own processing to the Internet connection module 11, the information output module 14, or the wireless communication module 15.

For example, the apparatus control section 13 supplies the wireless communication module 15 with transmission data passed from an application in a higher protocol layer or the like at a time of data transmission, and passes received data supplied from the wireless communication module 15 to an application in a higher protocol layer or the like at a time of data reception.

The information output module 14 includes, for example, an output device including a display element such as a liquid crystal display (LCD), an organic EL display (OLED: Organic Light Emitting Diode), or an LED (Light Emitting Diode) display.

The information output module 14 has a function of displaying information necessary for the user on the basis of information supplied from the apparatus control section 13. Here, the information processed by the information output module 14 includes, for example, a state of operation of the communicating device 10, information obtained via the Internet network, and the like.

The wireless communication module 15 includes, for example, a wireless chip, a peripheral circuit, a microcontroller, a semiconductor memory, and the like. The wireless communication module 15 performs various kinds of processing related to wireless communication under control of the apparatus control section 13. Details of the configuration of the wireless communication module 15 will be described later with reference to FIG. 17.

It is to be noted that, while description in the following will be made by taking a wireless communication module including a wireless communication chip, a peripheral circuit, and the like as an example, the present technology is not limited to wireless communication modules, but is applicable to, for example, wireless communication chips, wireless communication LSIs, and the like. Further, whether or not to include an antenna in the wireless communication module can be decided as desired.

In addition, while the apparatus control section 13 and the wireless communication module 15 are essential constituent elements in the communicating device 10 of FIG. 16, whether or not to include the Internet connection module 11, the information input module 12, and the information output module 14 other than the apparatus control section 13 and the wireless communication module 15 as constituent elements can be decided as desired.

That is, each communicating device 10 operating as a base station or a terminal station can include only necessary modules, and can be configured such that unnecessary parts are simplified or not incorporated therein. More specifically, the Internet connection module 11, for example, can be incorporated only in a base station, and the information input module 12 and the information output module 14 can be incorporated only in a terminal station.

(Example of Configuration of Wireless Communication Module)

Figure 17:
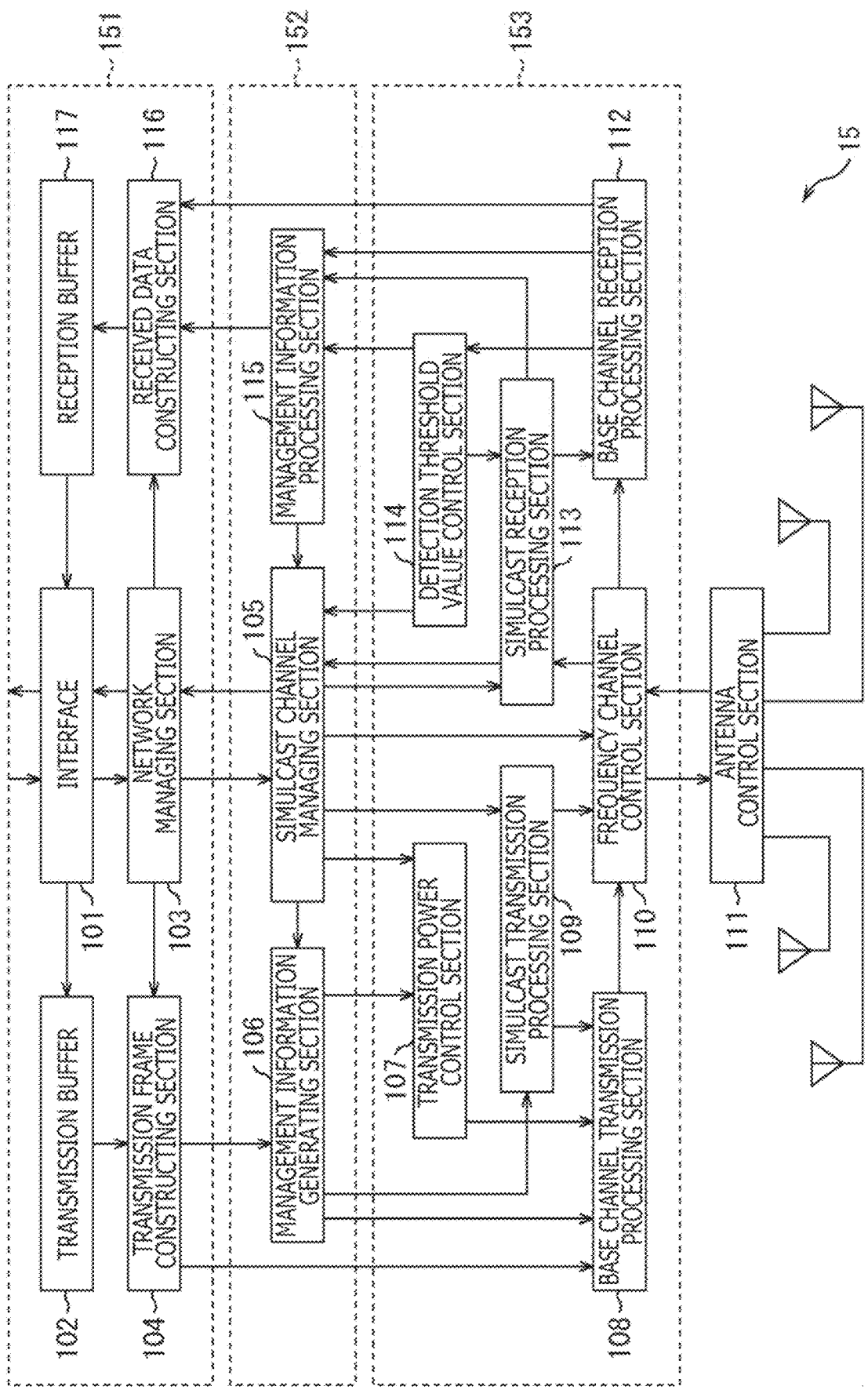
FIG. 17 is a block diagram illustrating an example of a configuration of a wireless communication module.

FIG. 17 is a block diagram illustrating an example of a configuration of the wireless communication module 15 in FIG. 16.

In the wireless communication module 15, an interface 101, a transmission buffer 102, a network managing section 103, and a transmission frame constructing section 104 are configured as transmitting side common parts for a communicating device (wireless communication module) supporting the method in the present situation.

In addition, the wireless communication module 15 includes a simulcast channel managing section 105, a management information generating section 106, a transmission power control section 107, a base channel transmission processing section 108, a simulcast transmission processing section 109, a frequency channel control section 110, an antenna control section 111, a base channel reception processing section 112, a simulcast reception processing section 113, a detection threshold value control section 114, and a management information processing section 115.

That is, as a characteristic configuration in the wireless communication module 15 of the communicating device 10 supporting the new method, the simulcast transmission processing section 109 enabling signal transmission on plural frequency channels and the simulcast reception processing section 113 enabling signal reception on plural frequency channels are arranged in addition to the simulcast channel managing section 105 and the frequency channel control section 110.

Further, in the wireless communication module 15, a received data constructing section 116 and a reception buffer 117 are configured as receiving side common parts for a communicating device (wireless communication module) supporting the method in the present situation.

The interface 101 includes, for example, an input-output interface circuit or the like. The interface 101 is an interface for exchanging data with the apparatus control section 13 (FIG. 16). The interface 101 has a function for exchanging information to be input to the apparatus control section 13 and information output from the apparatus control section 13 in a predetermined signal format.

The interface 101 writes transmission data input from the apparatus control section 13 to the transmission buffer 102. In addition, the interface 101 supplies information input from the apparatus control section 13 to the network managing section 103, or outputs information supplied from the network managing section 103 to the apparatus control section 13.

The transmission buffer 102 includes, for example, a semiconductor memory device such as a buffer memory. The transmission buffer 102 temporarily stores the transmission data written thereto via the interface 101.

The network managing section 103 manages address information of the communicating device 10 on the wireless network or the like. In addition, the network managing section 103 is configured to make connection to the Internet network in a case where the communicating device 10 is operating as a base station.

The transmission frame constructing section 104 has functions of reading the transmission data stored in the transmission buffer 102 and constructing the transmission data as a data frame to be transmitted by wireless communication. For example, the transmission frame constructing section 104 collects plural MPDUs stored in the transmission buffer 102, constructs an A-MPDU frame, and supplies the A-MPDU frame to the base channel transmission processing section 108.

The simulcast channel managing section 105 has a function of centrally managing control of transmitting and receiving information by using plural frequency channels at the same time. The simulcast channel managing section 105 grasps usable frequency channels from moment to moment.

The management information generating section 106 has a function of constructing a control frame necessary for a communication control protocol. For example, the communicating device 10Tx on the transmitting side is configured to construct a control frame such as an RTS frame or an SBAR frame, and the communicating device 10Rx on the receiving side is configured to construct a control frame such as a CTS frame or a SACK frame.

The transmission power control section 107 has a function of controlling transmission power such that a signal does not reach an unnecessary radio wave reachable range in a case where a predetermined frame is transmitted. In this case, the transmission power control section 107 is provided with a function of performing control so as to transmit data after adjusting a minimum necessary transmission power such that the signal is delivered with an intended reception field strength to the communicating device 10Rx on the receiving side. In this case, for example, the transmission power can be adjusted for each frame to be transmitted.

The base channel transmission processing section 108 has functions of adding a predetermined preamble signal to information such as a data frame to be wirelessly transmitted on a predetermined frequency channel, converting the resulting information into a baseband signal in a predetermined format, and processing the baseband signal as an analog signal.

The simulcast transmission processing section 109 has a function of transmitting an SBAR frame, a SACK frame, or a data frame on frequency channels on which to perform simulcast under control of the simulcast channel managing section 105.

Incidentally, while the simulcast transmission processing section 109 may include hardware similar to that of the base channel transmission processing section 108 described above, it suffices for the simulcast transmission processing section 109 to include, for example, a minimum necessary circuit that can prepare a frame such as an SBAR frame or a SACK frame in advance, and further identical circuits may be formed in parallel with each other according to the number of frequency channels to be used.

The frequency channel control section 110 has a function of setting frequency channels to be used for data and control information (frames including the data and the control information) to be transmitted and received on a base channel and simulcast channels. The frequency channel control section 110 is, for example, configured to select and control frequency channels on which to transmit and receive a data frame, an SBAR frame, or a SACK frame.

The antenna control section 111 is formed by connecting plural antenna elements. The antenna control section 111 may be configured to use a same antenna element or use different antenna elements to perform control of wirelessly transmitting a signal as a spatial multiplexing stream, control of wirelessly receiving a signal transmitted as a spatial multiplexing stream, and control of signal transmission and reception on the base channel and the simulcast channels.

The base channel reception processing section 112 has a function of performing reception processing that, in a case of detecting a predetermined preamble signal, separates each stream and receives a header and a data part added following the preamble signal.

The simulcast reception processing section 113 has a function of receiving an SBAR frame, a SACK frame, or a data frame on frequency channels on which simulcast is performed under control of the simulcast channel managing section 105.

Incidentally, while the simulcast reception processing section 113 may include hardware similar to that of the base channel reception processing section 112 described above, it suffices for the simulcast reception processing section 113 to include, for example, a circuit that performs carrier detection, a circuit that obtains a header parameter, or the like, and further identical circuits may be formed in parallel with each other according to the number of frequency channels on which to detect conditions at the same time.

The detection threshold value control section 114 sets a signal detection level such that, in a case where the transmission power control section 107 performs transmission power control, a signal from a communicating device 10 present within the range of the transmission power control can be detected. In this case, the detection threshold value control section 114 is provided with a function of performing control so as to be able to detect the signal at a minimum necessary detection threshold value. The detection threshold value control section 114 is configured to then detect a signal equal to or higher than a predetermined detection level when there is a frequency channel currently being used.

The management information processing section 115 has a function of constructing control information necessary for the communication control protocol in a case where a received frame is a control frame. For example, the communicating device 10Tx on the transmitting side is configured to construct control information from a CTS frame, a SACK frame, or the like, and the communicating device 10Rx on the receiving side is configured to construct control information from an RTS frame, an SBAR frame, or the like.

The received data constructing section 116 has functions of extracting MPDUs by removing predetermined header information from a received data frame (for example an A-MPDU frame) and extracting only data parts that are needed. The data parts extracted by the received data constructing section 116 are written to the reception buffer 117.

The reception buffer 117 includes, for example, a semiconductor memory device such as a buffer memory or the like. The reception buffer 117 is a buffer for temporarily storing the extracted parts on the basis of a sequence until all of data is obtained. The reception buffer 117 is configured to store data until the arrival of timing of outputting the received data to the apparatus control section 13 (for example, a connected application apparatus).

Then, when the timing of outputting the received data arrives, the received data stored in the reception buffer 117 is read as appropriate and is output to the apparatus control section 13 via the interface 101.

Incidentally, in FIG. 17, arrows between blocks represent a flow or control of data (signal), and each block operates in cooperation with other blocks connected by arrows in order to implement own functions. Specifically, for example, the simulcast channel managing section 105 operates in cooperation with the network managing section 103, the management information generating section 106, the transmission power control section 107, the simulcast transmission processing section 109, the frequency channel control section 110, the simulcast reception processing section 113, the detection threshold value control section 114, and the management information processing section 115 in order to implement a function of centrally managing the control of transmitting and receiving information by using plural frequency channels at the same time.

In addition, in FIG. 17, the parts constituting the wireless communication module 15 can, for example, be divided into three blocks, that is, a transmission and reception data input-output section 151, a control section 152, and a radio signal transmitting and receiving section 153, as indicated by broken line frames. However, the parts constituting the wireless communication module 15 may be configured to be divided into a different number of blocks (the number is, for example, four or more).

Here, the transmission and reception data input-output section 151 includes the interface 101, the transmission buffer 102, the network managing section 103, the transmission frame constructing section 104, the received data constructing section 116, and the reception buffer 117. The transmission and reception data input-output section 151 mainly performs processing and control related to input transmission data and received data to be output.

In addition, the control section 152 includes the simulcast channel managing section 105, the management information generating section 106, and the management information processing section 115. The control section 152 mainly performs processing and control related to frame transmission and reception. Incidentally, the control section 152 may include other blocks such as the simulcast transmission processing section 109, the frequency channel control section 110, and the simulcast reception processing section 113.

Further, the radio signal transmitting and receiving section 153 includes the transmission power control section 107, the base channel transmission processing section 108, the simulcast transmission processing section 109, the frequency channel control section 110, the base channel reception processing section 112, the simulcast reception processing section 113, and the detection threshold value control section 114. The radio signal transmitting and receiving section 153 mainly performs processing and control related to signals such as a transmission signal and a received signal.

In the wireless communication module 15 configured as described above, the following processing, for example, is performed by the control section 152 including the simulcast channel managing section 105, the simulcast transmission processing section 109, the frequency channel control section 110, and the simulcast reception processing section 113, in particular.

Specifically, in the communicating device 10Tx on the transmitting side (wireless communication module 15 of the communicating device 10Tx on the transmitting side), the control section 152 performs control of transmitting a data frame to the communicating device 10Rx on the receiving side by using a usable frequency channel, generating an SBAR frame (SBAR frame of FIG. 6) including channel information (for example, the Simulcast Channel Map in FIG. 6) regarding plural usable frequency channels, and transmitting the generated SBAR frame to the communicating device 10Rx on the receiving side by using the plural frequency channels (simulcast channels) (simulcast transmission).

In addition, in the communicating device 10Rx on the receiving side (wireless communication module 15 of the communicating device 10Rx on the receiving side), the control section 152 performs control of receiving a data frame transmitted from the communicating device 10Tx on the transmitting side by using a usable frequency channel, generating a SACK frame (SACK frame of FIG. 12) including channel information (for example, the Simulcast Channel Map in FIG. 12) regarding plural usable frequency channels, and transmitting the generated SACK frame to the communicating device 10Tx on the transmitting side by using the plural frequency channels (simulcast channels) (simulcast transmission).

(Operation on Data Transmitting Side)

An operation of the communicating device 10Tx on the data frame transmitting side (wireless communication module 15 of the communicating device 10Tx on the data frame transmitting side) will first be described with reference to a flowchart of FIG. 18 and FIG. 19.

The wireless communication module 15 determines whether or not to transmit an A-MPDU frame (S101). Incidentally, in a case where it is determined in the determination processing of step S101 that no A-MPDU frame is to be transmitted ("NO" in S101), the processing is ended immediately.

In a case where it is determined in the determination processing of step S101 that an A-MPDU frame is to be transmitted ("YES" in S101), the processing is advanced to step S102, and the processing of steps S102 to S104 is performed.

Specifically, in the wireless communication module 15, the base channel transmission processing section 108 transmits a data frame (A-MPDU frame) on a frequency channel corresponding to the base channel (S102). In addition, the simulcast channel managing section 105 determines whether or not simulcast channels can be supported, that is, whether or not SBAR frames and SACK frames are supported (S103).

In a case where it is determined in the determination processing of step S103 that simulcast channels can be supported, the processing is advanced to step S104. Then, the simulcast channel managing section 105 sets frequency channels on which to perform simulcast reception (S104).

That is, the wireless communication module 15 is configured to grasp, in addition to the data transmission on the base channel on which the original A-MPDU frame is transmitted, the usage conditions of the other simulcast channels (simulcast channel candidates, as it were).

When the processing of step S104 is ended, the processing is advanced to step S105. Then, in a case where the simulcast channel managing section 105 determines that energy is detected on a simulcast channel (simulcast channel candidate) ("YES" in S105), the simulcast channel managing section 105 determines that the frequency channel on which the energy is detected is being used, and sets a BUSY state to the frequency channel in question (S106).

That is, here, in a case where a signal equal to or higher than a predetermined reception field strength is detected on any one of plural frequency channels (simulcast channel candidates) being monitored, the frequency channel on which the signal is detected is regarded as being used. At this time, a set value of the reception field strength can be made variable according to a characteristic of the detected signal. Here, for example, it can be made easy for the communicating device 10Tx on the transmitting side to detect a signal addressed to the communicating device 10Tx itself by setting a lower set value for the signal addressed to the communicating device 10Tx itself, whereas it can be made difficult for the communicating device 10Tx on the transmitting side to detect a signal addressed to another adjacent communicating device by setting a higher set value for the signal addressed to the other adjacent communicating device.

Further, in the wireless communication module 15, in a case where a predetermined preamble signal is detected ("YES" in S107), a parameter described in header information is obtained (S108), and a network allocation vector (NAV) on the frequency channel in question is set (S109).

That is, here, in a case where the predetermined preamble signal is detected on any one of the plural frequency channels (simulcast channel candidates) being monitored, a time for which the frequency channel where the preamble signal is detected will be occupied can be calculated, for example, on the basis of the parameter described in the header information thereafter obtained, and the frequency channel on which the preamble signal is detected can be regarded as being used until the calculated time passes.

The wireless communication module 15 is configured to return to step S105 and repeat grasping the usage conditions of the frequency channel in the processing of these steps S105 to S109 until it is determined that an end of the A-MPDU frame has arrived ("YES" in S110). This processing is performed on all of the usable frequency channels.

Incidentally, here, in a case where it is determined in the determination processing of step S105 that energy is not detected ("NO" in S105), or in a case where it is determined in the determination processing of step S107 that the preamble signal is not detected ("NO" in S107), the subsequent processing is skipped, and the processing is advanced to step S110.

Then, in a case where it is determined in the determination processing of step S110 that the end of the A-MPDU frame has arrived ("YES" in S110), the processing is advanced to step S111, and the processing of steps S111 to S115 is performed.

Specifically, in the wireless communication module 15, the simulcast channel managing section 105 grasps usable frequency channels (simulcast channel candidates) on which a BUSY state or a network allocation vector (NAV) is not set at the point in time (S111) and sets the frequency channels as simulcast channels (S112).

In addition, the simulcast transmission processing section 109 sets information such as channel information (for example, the Simulcast Channel Map in FIG. 6) for simulcast transmission in an SBAR frame (S113) and causes the information to actually be transmitted as the SBAR frame (S114). The wireless communication module 15 is configured to then wait for a return of a SACK frame on the frequency channels set as the simulcast channels (S115).

Incidentally, in a case where it is determined in the determination processing of step S103 that simulcast channels are not supported ("NO" in S103), the processing of steps S104 to S113 is skipped, and the processing is advanced to step S114. In this case, SBAR frames and SACK frames are not supported. Thus, as in the method in the present situation, the wireless communication module 15 transmits a BAR frame only on a frequency channel corresponding to the base channel (S114), and thereafter waits for an ACK frame (S115).

When the processing of step S115 is ended, the processing is advanced to step S116. Then, the wireless communication module 15 determines whether or not a SACK frame (or an ACK frame) is received. In a case where it is determined in the determination processing of step S116 that a SACK frame (or an ACK frame) is received ("YES" in S116), whether or not there is data not yet delivered to the communicating device 10Rx on the receiving side is determined (S117).

In a case where it is determined in the determination processing of step S117 that there is no undelivered data ("NO" in S117), the transmission of a series of data frames is ended. On the other hand, in a case where it is determined in the determination processing of step S117 that there is data not delivered yet ("YES" in S117), the processing is advanced to step S118, and the processing of steps S118 to S120 is performed.

Specifically, in the wireless communication module 15, the simulcast transmission processing section 109 identifies data not yet delivered to the communicating device 10Rx on the receiving side (that is, data that needs to be retransmitted) on the basis of identifying information included in the SACK frame, and constructs retransmission data (S118). In addition, the simulcast channel managing section 105 sets frequency channels to be used for retransmission from among the usable frequency channels (S119). A retransmission frame for retransmission to the communicating device 10Rx on the receiving side is thereby set (S120).

Alternatively, in a case where it is determined in the determination processing of step S116 that no SACK frame (or no ACK frame) is received ("NO" in S116), the processing is advanced to step S121. In this case, all of MPDUs are constructed as the retransmission data (S121), and the retransmission frame is set (S120). However, it is not necessary to set all of the MPDUs as the retransmission data when the SACK frame is received on at least one channel.

When the processing of step S120 is ended, the processing is advanced to step S122. In a case where a wait is performed on all of the usable frequency channels as the simulcast channels in the determination processing of step S122 ("NO" in S122), the processing is returned to step S116. Then, whether or not the SACK frame is received is confirmed on all of the frequency channels on which the SBAR frame is transmitted (S116), and the processing of steps S117 to S122 described above is performed as appropriate.

The wireless communication module 15 is configured to then transmit the retransmission frame after a waiting time has passed according to a predetermined access procedure, that is, when the wireless transmission line becomes usable ("YES" in S123) (S124). Incidentally, here, the processing may be configured to return from step S124 to step S104, after transmitting the retransmission frame, to perform transmission of an SBAR frame and return of a SACK frame again.

The operation of the communicating device 10Tx on the data frame transmitting side has been described above.

(Operation on Data Receiving Side)

An operation of the communicating device 10Rx on the data frame receiving side (wireless communication module 15 of the communicating device 10Rx on the data frame receiving side) will next be described with reference to a flowchart of FIG. 20 and FIG. 21.

The wireless communication module 15 determines whether or not to receive an A-MPDU frame (S201). Incidentally, in a case where it is determined in the determination processing of step S201 that no A-MPDU frame is to be received ("NO" in S201), the processing is ended immediately.

In a case where it is determined in the determination processing of step S201 that an A-MPDU frame is to be received ("YES" in S201), the processing is advanced to step S202, and the processing of steps S202 to S204 is performed.

Specifically, in the wireless communication module 15, the base channel reception processing section 112 receives a data frame (A-MPDU frame) transmitted from the communicating device 10Tx on the transmitting side on the frequency channel corresponding to the base channel (S202). In addition, the simulcast channel managing section 105 determines whether or not simulcast channels are supported (S203).

In a case where it is determined in the determination processing of step S203 that simulcast channels can be supported, the processing is advanced to step S204. Then, the simulcast channel managing section 105 sets frequency channels on which to perform simulcast reception (S204). That is, the wireless communication module 15 is configured to grasp, in addition to the data reception on the base channel on which the original A-MPDU frame is received, the usage conditions of the other simulcast channels (simulcast channel candidates, as it were).

When the processing of step S204 is ended, the processing is advanced to step S205. Then, in a case where the simulcast channel managing section 105 determines that energy is detected on a simulcast channel (simulcast channel candidate) ("YES" in S205), the simulcast channel managing section 105 determines that the frequency channel in question is being used and sets a BUSY state to the frequency channel in question (S206).

That is, here, in a case where a signal equal to or higher than a predetermined reception field strength is detected on any one of plural frequency channels (simulcast channel candidates) being monitored, the frequency channel on which the signal is detected is regarded as being used. At this time, a set value of the reception field strength can be made variable according to a characteristic of the detected signal. Here, for example, it can be made easy for the communicating device 10Rx on the receiving side to detect a signal addressed to the communicating device 10Tx itself by setting a lower set value for the signal addressed to the communicating device 10Tx itself, whereas it can be made difficult for the communicating device 10Rx on the receiving side to detect a signal addressed to another adjacent communicating device by setting a higher set value for the signal addressed to the other adjacent communicating device.

Further, in the wireless communication module 15, in a case where a predetermined preamble signal is detected ("YES" in S207), a parameter described in header information is obtained (S208), and a network allocation vector (NAV) on the frequency channel in question is set (S209).

That is, here, in a case where the predetermined preamble signal is detected on any one of the plural frequency channels (simulcast channel candidates) being monitored, a time for which the frequency channel where the preamble signal is detected will be occupied can be calculated, for example, on the basis of the parameter described in the header information thereafter obtained, and the frequency channel on which the preamble signal is detected can be regarded as being used until the calculated time passes.

The wireless communication module 15 is configured to return to step S205 and repeat grasping the usage conditions of the frequency channel in the processing of these steps S205 to S209 until it is determined that an end of the A-MPDU frame has arrived ("YES" in S210). This processing is performed on all of the usable frequency channels.

Incidentally, here, in a case where it is determined in the determination processing of step S205 that energy is not detected ("NO" in S205), or in a case where it is determined in the determination processing of step S207 that the preamble signal is not detected ("NO" in S207), the subsequent processing is skipped, and the processing is advanced to step S210.

Then, in a case where it is determined in the determination processing of step S210 that the end of the A-MPDU frame has arrived ("YES" in S210), the processing is advanced to step S211, and the processing of steps S211 to S213 is performed.

Specifically, in the wireless communication module 15, the simulcast channel managing section 105 grasps usable frequency channels (simulcast channel candidates) on which a BUSY state or a network allocation vector (NAV) is not set at the point in time (S211) and sets the frequency channels as simulcast channels (S212).

In addition, the simulcast transmission processing section 109 sets information such as channel information (for example, the Simulcast Channel Map in FIG. 12) for simulcast transmission in a SACK frame (213). When the processing of step S213 is ended, the processing is advanced to step S217. That is, the wireless communication module 15 is configured to wait for an SBAR frame on the frequency channels set as the simulcast channels (S217).

On the other hand, in a case where it is determined in the determination processing of step S203 that simulcast channels are not supported ("NO" in S203), the processing is advanced to step S214. In addition, also in the case where simulcast channels can be supported ("YES" in S203), the data frame (A-MPDU frame) is being received on the base channel. In this case, the wireless communication module 15 continues receiving the A-MPDU frame by using the frequency channel corresponding to the base channel, and in a case where each MPDU constituting the A-MPDU frame is received normally ("YES" in S214), the wireless communication module 15 sets the MPDUs as already received MPDUs (S215).

Further, the wireless communication module 15 determines whether or not the A-MPDU frame is ended (S216). Until the A-MPDU frame is ended, the processing returns to step S214 to determine whether each MPDU constituting the A-MPDU frame is received normally. The wireless communication module 15 is configured to then wait for a BAR frame in a case where it is determined that the A-MPDU frame is ended ("YES" in S216) (S217).

Then, the wireless communication module 15 determines whether or not an SBAR frame (or a BAR frame) is received (S218). In a case where it is determined in the determination processing of step S218 that an SBAR frame (or a BAR frame) is received ("YES" in S218), the processing is advanced to step S219, and the processing of steps S219 to S220 is performed.

That is, in the wireless communication module 15, information indicating that the MPDUs are already received is obtained (S219), and therefore the simulcast transmission processing section 109 sets the obtained information indicating that the MPDUs are already received as a SACK frame (or an ACK frame) (S220). Incidentally, in a case where it is determined in the determination processing of step S218 that no SBAR frame (or no BAR frame) is received ("NO" in S218), the processing of receiving the series of data frames is ended.

When the processing of step S220 is ended, the processing is advanced to step S221. In a case where a wait is performed on all of the usable frequency channels as the simulcast channels in the determination processing of step S221 ("NO" in S221), the processing is returned to step S218. Then, the SACK frame is set on all of the frequency channels on which the SBAR frame is received.

The wireless communication module 15 is configured to then transmit the SACK frame (or the ACK frame) (S222) and determine whether or not there is retransmission data (S223). In a case where it is determined in the determination processing of step S223 that there is no retransmission data ("NO" in S223), the processing of receiving the series of data frames is ended.

In addition, in a case where it is determined in the determination processing of step S223 that there is retransmission data ("YES" in S223), the processing is advanced to step S224. In the wireless communication module 15, the simulcast channel managing section 105 is configured to then set frequency channels to be used for waiting for a retransmission frame from among the usable frequency channels (S224), return to the processing of step S201, and wait for the retransmission frame (A-MPDU frame) to be retransmitted from the communicating device 10Tx on the transmitting side.

The operation of the communicating device 10Rx on the data frame receiving side has been described above.

As described above, in the communicating method to which the present technology is applied (new method), the communicating device 10Tx on the data frame transmitting side and the communicating device 10Rx on the receiving side each monitor the frequency channels other than the data frame transmission and reception channel. Then, the communicating device 10Tx on the transmitting side transmits an SBAR frame, that is, a block ACK request frame by using all of the usable frequency channels, and the communicating device 10Rx on the receiving side that receives the SBAR frame also transmits a SACK frame, that is, a Block ACK frame by using all of the usable frequency channels.

It is thereby possible to exchange control information more reliably and realize communication of higher reliability.

That is, the new method exchanges the SBAR frame and the SACK frame by using plural usable frequency channels, and thus enables information exchange with significantly improved reliability as compared with a case where one frequency channel is used as in the method in the present situation. That is, as compared with a method of exchanging a BAR frame and an ACK frame by using only one frequency channel as in the method in the present situation, the new method can exchange ACK information more reliably because the new method can exchange the SBAR frame and the SACK frame by using frequency channels excluding a frequency channel on which a transmission error is caused. In addition, at this time, the SBAR frame and the SACK frame include channel information (Simulcast Channel Map in FIG. 6 or FIG. 12). Thus, the communicating device 10Rx on the receiving side and the communicating device 10Tx on the transmitting side can each surely grasp the frequency channels used.

In addition, for example, in a case where a large number of pieces of data are transmitted by using an A-MPDU frame as data frames, even in a case where it is difficult to return the ACK frame because the frequency channel used for the transmission is subjected to interference from the other systems, the new method can reliably return the SACK frame by using the other frequency channels.

Further, the new method is not limited to data retransmission using the data transmission channel as in the method in the present situation, but transmits retransmission data by using the frequency channels on which the communicating device 10Tx on the transmitting side receives the SACK frame. Thus, a retransmitting method of higher reliability can be realized.

That is, the new method can more reliably transmit the retransmission data by performing the data retransmission by using the channels on which the SBAR frame and the SACK frame can be obviously exchanged. It is thereby possible to apply the communication protocol of the wireless LAN system effectively even in an environment in which the other system is mixed.

In addition, the communicating device 10Tx on the transmitting side also uses the SACK frame including the channel information regarding the other frequency channels that can be used by the communicating device 10Rx on the receiving side. Thus, the communicating device 10Tx on the transmitting side can transmit (retransmit) a data frame (retransmission frame) including the retransmission data not received yet by using the frequency channels that can be used immediately previously. Further, because the new method exchanges the SBAR frame and the SACK frame reliably, the new method can prevent retransmission of the whole data due to an undelivered ACK frame and can set only necessary data as the retransmission data. As a result, transmission line usage efficiency can be improved.

2. Modifications

Examples of Other Configurations

The above-described communicating device 10Tx on the transmitting side can be configured as a base station (access point), and the communicating device 10Rx on the receiving side can be configured as a terminal station. However, the communicating device 10Tx or the communicating device 10Rx may be configured as a part (for example, a wireless communication module, a wireless chip, or the like) of a device constituting the base station or the terminal station.

In addition, for example, the communicating device 10Rx on the receiving side which is configured as a terminal station can be configured as an electronic apparatus having a wireless communication function, such as a smart phone, a tablet terminal, a mobile telephone, a personal computer, a digital camera, a game machine, a television receiver, a wearable terminal, or a speaker device.

Incidentally, while description has been made here assuming that the communicating device 10Tx on the transmitting side is a base station and that the communicating device 10Rx on the receiving side is a terminal station, the transmitting side and the receiving side may be reversed, and the base station may be the communicating device 10Rx on the receiving side and the terminal station may be the communicating device 10Tx on the transmitting side.

Figure 18:
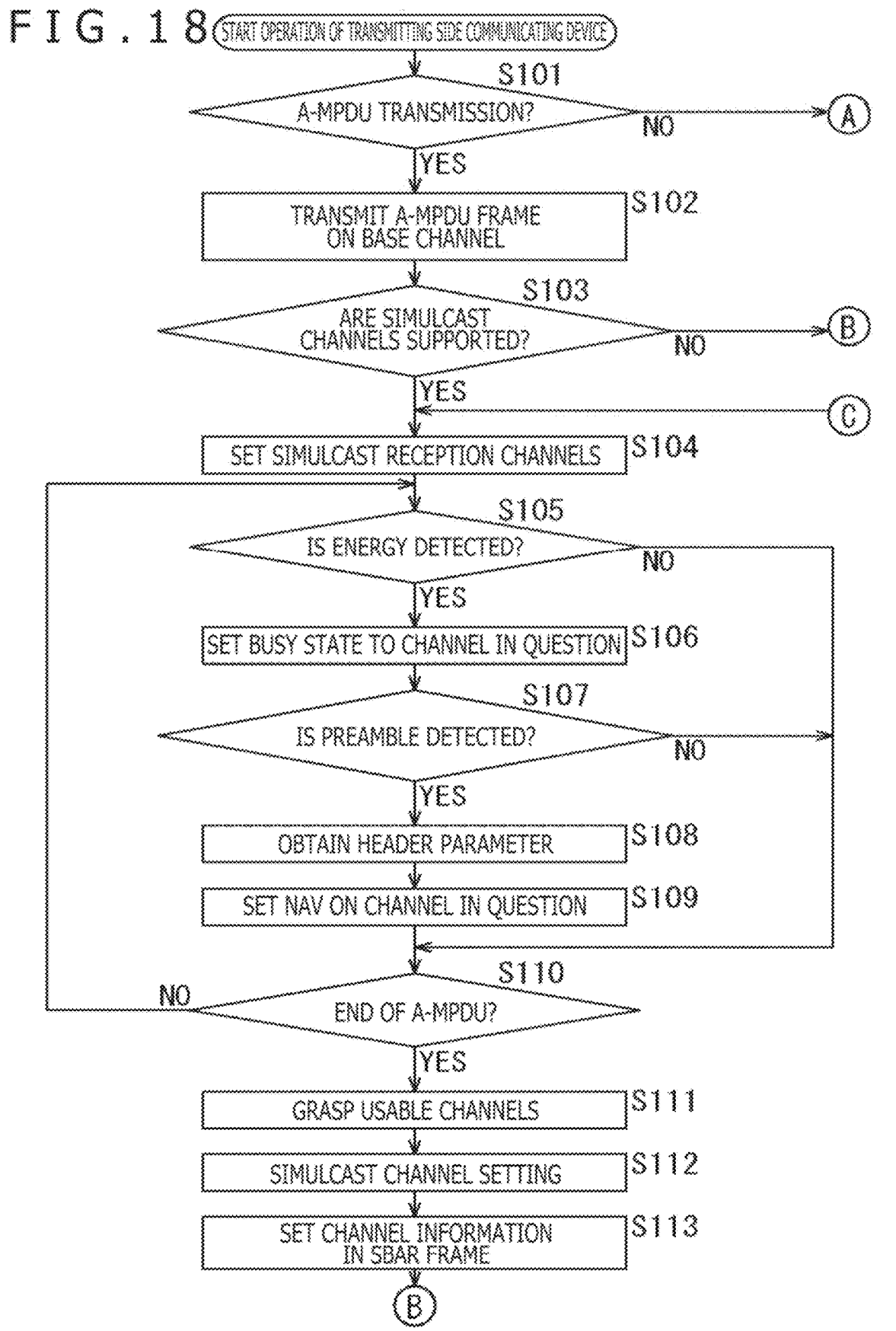
FIG. 18 is a flowchart of assistance in explaining an operation of a communicating device on a data frame transmitting side.
Figure 19:
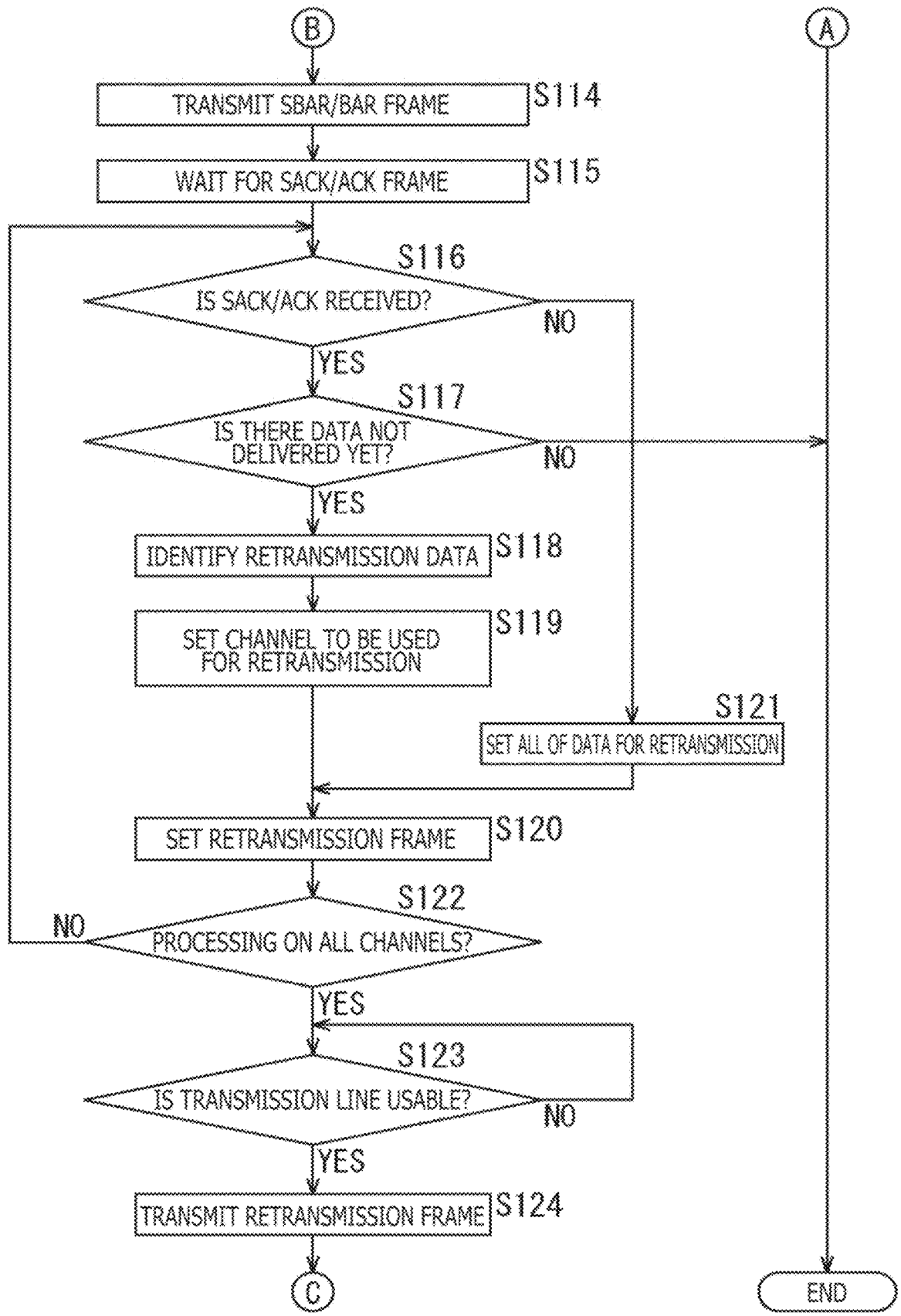
FIG. 19 is a flowchart of assistance in explaining the operation of the communicating device on the data frame transmitting side.
Figure 20:
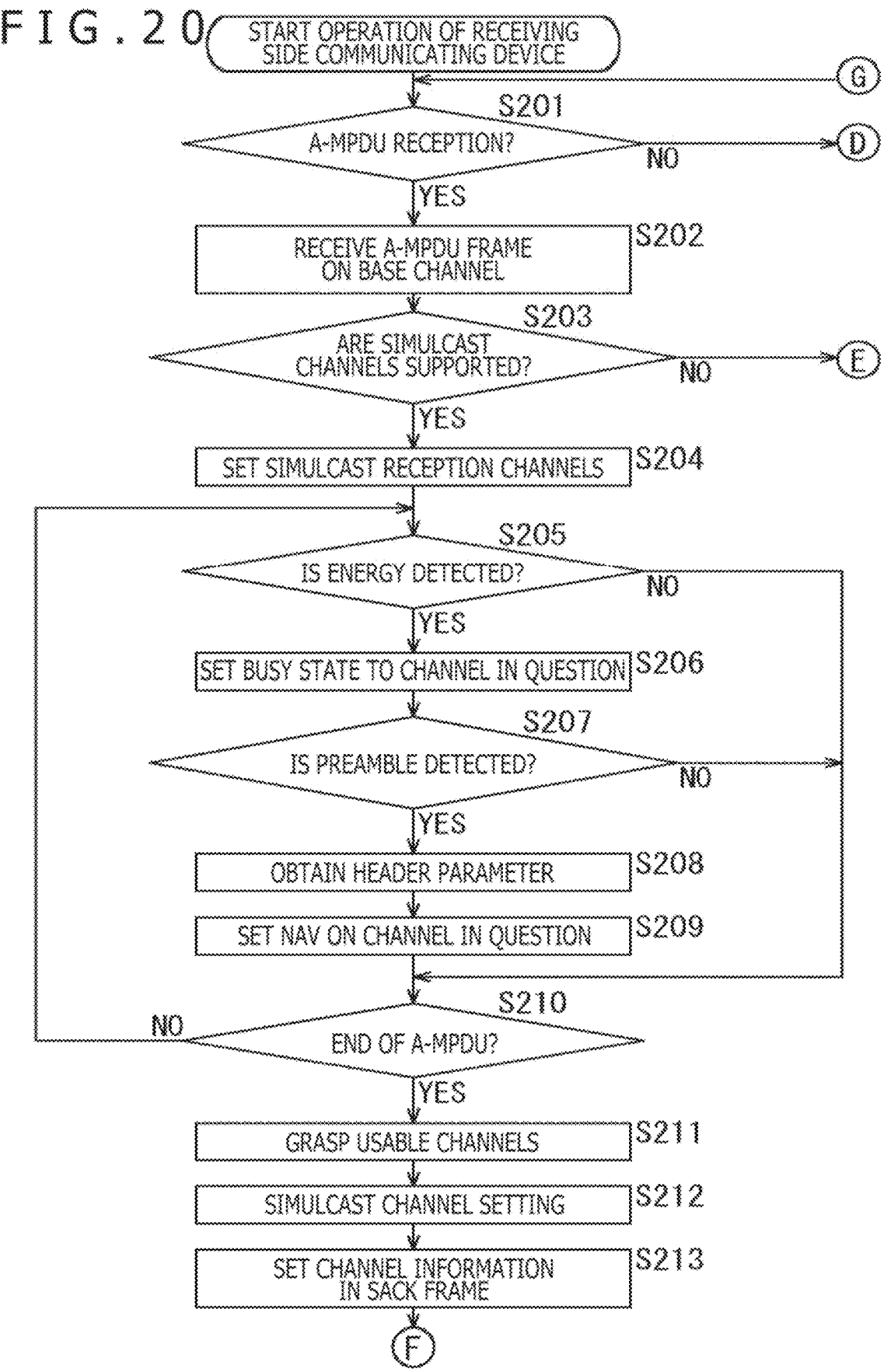
FIG. 20 is a flowchart of assistance in explaining an operation of a communicating device on a data frame receiving side.
Figure 21:
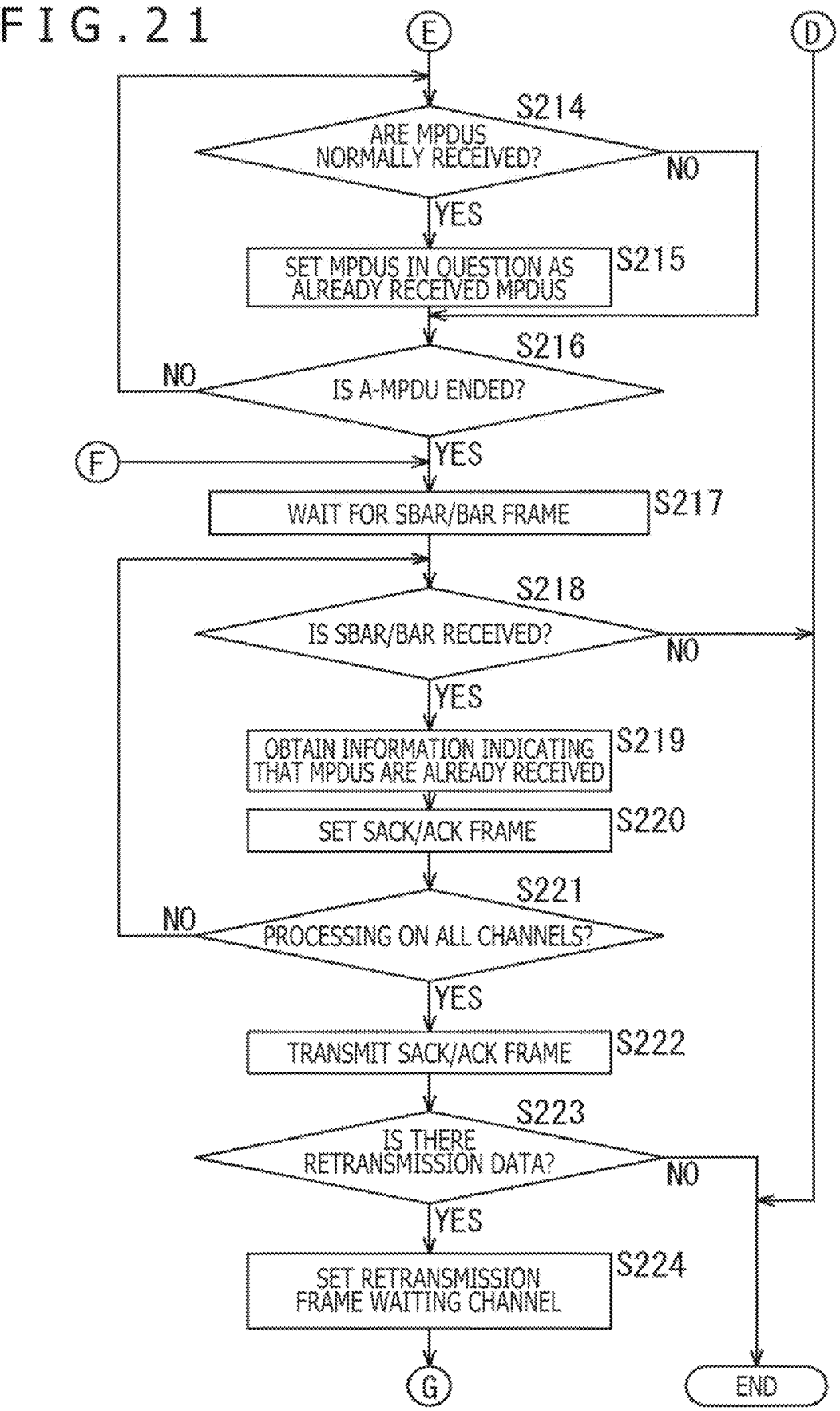
FIG. 21 is a flowchart of assistance in explaining the operation of the communicating device on the data frame receiving side.

That is, the base station as the communicating device 10 can perform not only the operation on the data frame transmitting side as illustrated in the flowchart of FIG. 18 and FIG. 19 but also the operation on the data frame receiving side as illustrated in the flowchart of FIG. 20 and FIG. 21. Similarly, the terminal station as the communicating device 10 can perform not only the operation on the data frame receiving side as illustrated in the flowchart of FIG. 20 and FIG. 21 but also the operation on the data frame transmitting side as illustrated in the flowchart of FIG. 18 and FIG. 19.

It is to be noted that embodiments of the present technology are not limited to the embodiment described above, but are susceptible of various changes without departing from the spirit of the present technology.

In addition, the present technology can also adopt the following configurations.

(1)

A communicating device including:
a control section configured to perform control of
transmitting data to another communicating device by using a usable frequency channel,
generating a request signal including first channel information regarding plural usable frequency channels, the request signal being a signal for requesting an acknowledgment signal used to confirm normal reception of the data, and
transmitting the generated request signal to the other communicating device by using the plural frequency channels.

(2)

The communicating device according to the above (1), in which
the control section simultaneously transmits the request signal on each frequency channel included in the plural frequency channels.

(3)

The communicating device according to the above (1) or (2), in which
the control section monitors usage conditions of plural frequency channels different from the frequency channel used to transmit the data, and
the control section transmits the request signal by using the plural usable frequency channels according to a result of the monitoring.

(4)

The communicating device according to any one of the above (1) to (3), in which
the acknowledgment signal includes second channel information regarding plural frequency channels usable on a side of the other communicating device, and
the control section controls an operation of waiting for the acknowledgment signal to be transmitted from the other communicating device on the frequency channels on which the request signal is transmitted.

(5)

The communicating device according to any one of the above (1) to (4), in which
the data is transmitted as a data frame obtained by aggregating plural sub-frames,
the acknowledgment signal includes second channel information regarding plural frequency channels usable on a side of the other communicating device and identifying information regarding retransmission data that needs to be retransmitted, and
the control section identifies the retransmission data for each of the sub-frames on the basis of the identifying information included in the acknowledgment signal transmitted from the other communicating device.

(6)

The communicating device according to the above (5), in which
the control section transmits the retransmission data by using a frequency channel on which the acknowledgment signal is received.

(7)

The communicating device according to the above (3), in which,
in a case where the control section detects a signal equal to or higher than a predetermined reception field strength on any one of the plural frequency channels being monitored, the control section regards the frequency channel on which the signal is detected as being used.

(8)

The communicating device according to the above (7), in which
a set value of the reception field strength is made variable according to a characteristic of the detected signal.

(9)

The communicating device according to any one of the above (3), (7), and (8), in which
the control section calculates, in a case where the control section detects a predetermined preamble signal on any one of the plural frequency channels being monitored, a time for which the frequency channel on which the preamble signal is detected is to be occupied, on the basis of a parameter described in subsequently obtained header information, and
the control section regards the frequency channel on which the preamble signal is detected as being used until the calculated time passes.

(10)

A communicating method of a communicating device performing control of:
transmitting data to another communicating device by using a usable frequency channel;
generating a request signal including channel information regarding plural usable frequency channels, the request signal being a signal for requesting an acknowledgment signal used to confirm normal reception of the data; and
transmitting the generated request signal to the other communicating device by using the plural frequency channels.

(11)

A communicating device including:
a control section configured to perform control of
receiving data transmitted from another communicating device, by using a usable frequency channel,
generating an acknowledgment signal including first channel information regarding plural usable frequency channels, the acknowledgment signal being a signal used to confirm normal reception of the data, and
transmitting the generated acknowledgment signal to the other communicating device by using the plural frequency channels.

(12)

The communicating device according to the above (11), in which
the control section simultaneously transmits the acknowledgment signal on each frequency channel included in the plural frequency channels.

(13)

The communicating device according to the above (11) or (12), in which
the control section monitors usage conditions of plural frequency channels different from the frequency channel used to receive the data, and
the control section transmits the acknowledgment signal by using the plural usable frequency channels according to a result of the monitoring.

(14)
The communicating device according to any one of the above (11) to (13), in which
the control section controls an operation of waiting, on frequency channels excluding the frequency channel on which the data is received, for a request signal including second channel information regarding plural frequency channels usable on a side of the other communicating device, the request signal being a signal to be transmitted from the other communicating device to request the acknowledgment signal.

(15)
The communicating device according to any one of the above (11) to (13), in which
the control section receives a request signal including second channel information regarding plural frequency channels usable on a side of the other communicating device, the request signal being a signal transmitted from the other communicating device to request the acknowledgment signal, and
the control section transmits the acknowledgment signal by using plural frequency channels on which the request signal is received.

(16)
The communicating device according to any one of the above (11) to (15), in which
the data is transmitted as a data frame obtained by aggregating plural sub-frames, and
the control section confirms reception of each of the sub-frames and identifies retransmission data that needs to be retransmitted, and
the control section transmits the acknowledgment signal including identifying information regarding the identified retransmission data by using the plural frequency channels.

(17)
The communicating device according to the above (16), in which
the control section controls an operation of waiting for the retransmission data to be transmitted from the other communicating device by using the frequency channels on which the acknowledgment signal is transmitted.

(18)
The communicating device according to the above (13), in which,
in a case where the control section detects a signal equal to or higher than a predetermined reception field strength on any one of the plural frequency channels being monitored, the control section regards the frequency channel on which the signal is detected as being used.

(19)
The communicating device according to the above (13) or (18), in which
the control section calculates, in a case where the control section detects a predetermined preamble signal on any one of the plural frequency channels being monitored, a time for which the frequency channel on which the preamble signal is detected is to be occupied, on the basis of a parameter described in subsequently obtained header information, and
the control section regards the frequency channel on which the preamble signal is detected as being used until the calculated time passes.

(20)
A communicating method of a communicating device performing control of:
receiving data transmitted from another communicating device, by using a usable frequency channel;
generating an acknowledgment signal including channel information regarding plural usable frequency channels, the acknowledgment signal being a signal used to confirm normal reception of the data; and
transmitting the generated acknowledgment signal to the other communicating device by using the plural frequency channels.

REFERENCE SIGNS LIST 10, 10Tx, 10Rx: Communicating device
11: Internet connection module
12: Information input module
13: Apparatus control section
14: Information output module
15: Wireless communication module
101: Interface
102: Transmission buffer
103: Network managing section
104: Transmission frame constructing section
105: Simulcast channel managing section
106: Management information generating section
107: Transmission power control section
108: Base channel transmission processing section
109: Simulcast transmission processing section
110: Frequency channel control section
111: Antenna control section
112: Base channel reception processing section
113: Simulcast reception processing section
114: Detection threshold value control section
115: Management information processing section
116: Received data constructing section
117: Reception buffer
151: Transmission and reception data input-output section
152: Control section
153: Radio signal transmitting and receiving section

The invention claimed is:
1. A wireless communication control device comprising:
circuitry configured to
control transmission of data of a wireless communication device to another wireless communication device by using a usable frequency channel, and
control transmission of a request signal of the wireless communication device wherein the request signal includes first channel information regarding plural usable frequency channels and the request signal is a signal for requesting an acknowledgment signal used to confirm reception of the data, to the other wireless communication device by using the plural usable frequency channels simultaneously, to receive the acknowledgment signal by using at least one of the plural usable frequency channels.

2. The wireless communication control device according to claim 1, wherein
the circuitry is configured to monitor usage conditions of plural frequency channels different from the frequency channel used to transmit the data, and
the circuitry is configured to control transmission of the request signal of the wireless communication device by using the plural usable frequency channels according to a result of the monitoring.

3. The wireless communication control device according to claim 2, wherein,
in a case where the circuitry is configured to detect a signal equal to or higher than a predetermined reception field strength on any one of the plural frequency channels being monitored, the circuitry is configured to specify the frequency channel on which the signal is detected as being used.

4. The wireless communication control device according to claim 3, wherein
a set value of the reception field strength is made variable according to a characteristic of the detected signal.

5. The wireless communication control device according to claim 2, wherein
the circuitry is configured to calculate, in a case where the circuitry is configured to detect a predetermined preamble signal on any one of the plural frequency channels being monitored, a time for which the frequency channel on which the preamble signal is detected is to be occupied on a basis of a parameter described in subsequently obtained header information, and
the circuitry is configured to specify the frequency channel on which the preamble signal is detected as being used until the calculated time passes.

6. The wireless communication control device according to claim 1, wherein
the acknowledgment signal includes second channel information regarding plural frequency channels usable on a side of the other wireless communication device, and
the circuitry is configured to control an operation of waiting for the acknowledgment signal to be transmitted from the other wireless communication device on the frequency channels on which the request signal of the wireless communication device is transmitted.

7. The wireless communication control device according to claim 1, wherein
the data is transmitted as a data frame obtained by aggregating plural sub-frames,
the acknowledgment signal includes second channel information regarding plural frequency channels usable on a side of the other wireless communication device and identifying information regarding retransmission data that needs to be retransmitted, and
the circuitry is configured to identify the retransmission data for each of the sub-frames on a basis of the identifying information included in the acknowledgment signal transmitted from the other wireless communication device.

8. The wireless communication control device according to claim 7, wherein
the circuitry is configured to control transmission of the retransmission data by using a frequency channel on which the acknowledgment signal is received.

9. A wireless communication control method, comprising:
transmitting data of a wireless communication device to another wireless communication device by using a usable frequency channel; and
transmitting a signal of the wireless communication device wherein the request signal includes first channel information regarding plural usable frequency channels and the request signal is a signal for requesting an acknowledgment signal used to confirm reception of the data, to the other wireless communication device by using the plural usable frequency channels simultaneously, to receive the acknowledgment signal by using at least one of the plural usable frequency channels.

10. A wireless communication control device comprising:
circuitry configured to
control reception of data transmitted from another wireless communication device, by using a usable frequency channel, and
in response to a request signal simultaneously transmitted from the other wireless communication device by using plural usable frequency channels from the other communicating device, control transmission of an acknowledgment signal to the other wireless communication device by using at least one of the plural usable frequency channels, the acknowledgment signal including first channel information regarding the plural usable frequency channels and being used to confirm reception of the data transmitted from the other wireless communication device.

11. The wireless communication control device according to claim 10, wherein
the circuitry is configured to simultaneously transmit the acknowledgment signal on each frequency channel included in the plural usable frequency channels.

12. The wireless communication control device according to claim 10, wherein
the circuitry is configured to monitor usage conditions of plural frequency channels different from the frequency channel used to receive the data, and
the circuitry is configured to control transmission of the acknowledgment signal by using the plural usable frequency channels according to a result of the monitoring.

13. The wireless communication control device according to claim 12, wherein,
in a case where the circuitry is configured to detect a signal equal to or higher than a predetermined reception field strength on any one of the plural frequency channels being monitored, the circuitry is configured to specify the frequency channel on which the signal is detected as being used.

14. The wireless communication control device according to claim 13, wherein
the circuitry is configured to calculate, in a case where the circuitry is configured to detect a predetermined preamble signal on any one of the plural frequency channels being monitored, a time for which the frequency channel on which the preamble signal is detected is to be occupied, on a basis of a parameter described in subsequently obtained header information, and
the circuitry is configured to specify the frequency channel on which the preamble signal is detected as being used until the calculated time passes.

15. The wireless communication control device according to claim 10, wherein
the circuitry is configured to control an operation of waiting, on frequency channels excluding the frequency channel on which the data is received, for the request signal including second channel information regarding plural frequency channels usable on a side of the other wireless communication device, the request signal being a signal to be transmitted from the other wireless communication device to request the acknowledgment signal.

16. The wireless communication control device according to claim 10, wherein
the circuitry is configured to control reception of the request signal including second channel information regarding plural frequency channels usable on a side of the other wireless communication device, the request signal being a signal transmitted from the other wireless communication device to request the acknowledgment signal, and the circuitry is configured to control transmission of the acknowledgment signal by using plural frequency channels on which the request signal is received.

17. The wireless communication control device according to claim 10, wherein the data is transmitted as a data frame obtained by aggregating plural sub-frames, and the circuitry is configured to determine reception of each of the sub-frames and identifies retransmission data that needs to be retransmitted, and the circuitry is configured to control transmission of the acknowledgment signal including identifying information regarding the identified retransmission data by using the plural frequency channels.

18. The wireless communication control device according to claim 17, wherein the circuitry is configured to control an operation of waiting for the retransmission data to be transmitted from the other wireless communication device by using the frequency channels on which the acknowledgment signal is transmitted.

19. A wireless communication control method, comprising:

receiving data transmitted from another wireless communication device, by using a usable frequency channel; and in response to a request signal simultaneously transmitted from the other wireless communication device by using plural usable frequency channels from the other communicating device, transmitting an acknowledgment signal to the other wireless communication device by using at least one of the plural usable frequency channels, the acknowledgment signal including first channel information regarding the plural usable frequency channels and being used to confirm reception of the data transmitted from the other wireless communication device.

* * * * *